US010552591B2

(12) United States Patent
Ganta et al.

(10) Patent No.: US 10,552,591 B2
(45) Date of Patent: Feb. 4, 2020

(54) RESOURCE OPTIMIZATION USING DATA ISOLATION TO PROVIDE SAND BOX CAPABILITY

(71) Applicant: Oracle International Corporation, Redwood Shores, CA (US)

(72) Inventors: Suman Ganta, Fremont, CA (US); Sundar Shenbagam, San Ramon, CA (US); Nikhil Sabharwal, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 7 days.

(21) Appl. No.: 15/486,763

(22) Filed: Apr. 13, 2017

(65) Prior Publication Data

US 2018/0074814 A1 Mar. 15, 2018

Related U.S. Application Data

(60) Provisional application No. 62/395,297, filed on Sep. 15, 2016.

(51) Int. Cl.
*G06F 21/31* (2013.01)
*G06F 21/62* (2013.01)
(Continued)

(52) U.S. Cl.
CPC ............. *G06F 21/31* (2013.01); *G06F 8/71* (2013.01); *G06F 11/3688* (2013.01); *G06F 21/53* (2013.01); *G06F 21/6218* (2013.01)

(58) Field of Classification Search
CPC ..... G06F 8/20; G06F 8/30; G06F 8/71; G06F 9/44505; G06F 9/44521; G06F 21/31;
(Continued)

(56) References Cited

U.S. PATENT DOCUMENTS 8,245,192 B1 * 8/2012 Chen .................. G06F 8/71
717/103
8,745,641 B1 * 6/2014 Coker ................. G06F 11/3668
719/313
(Continued)

OTHER PUBLICATIONS

Han, Z., et al., Evolutionary analysis of access control models: a formal concept analysis method, Proceedings of the 25th Annual International Conference on Computer Science and Software Engineering, 2015, pp. 261-264, [retrieved on Sep. 18, 2019], Retrieved from the Internet.*

(Continued)

*Primary Examiner* — Geoffrey R St Leger
(74) *Attorney, Agent, or Firm* — Trellis IP Law Group, PC

(57) ABSTRACT

According to one embodiment, data isolation is provided with respect to lifecycle phases of an application. For example, a test data isolation and a production data isolation of at least one resource are created. The test data isolation corresponds with a test lifecycle phase of the application and the production data isolation corresponds with a production lifecycle phase of the application. A first set of data is stored in the test data isolation and a second set of data is stored in the production data isolation. A test version of the application is executed in the test data isolation. A production version of the application is executed in the production data isolation. A particular executing version of the application is allowed to only access data according to a lifecycle phase selected for a user.

20 Claims, 15 Drawing Sheets

(51) Int. Cl.
  *G06F 11/36* (2006.01)
  *G06F 8/71* (2018.01)
  *G06F 21/53* (2013.01)
(58) Field of Classification Search
  CPC ....... G06F 21/6218; G06F 11/36–3696; G06F 2009/45587
  USPC .......................... 717/101, 120–122, 124–127
  See application file for complete search history.

(56) References Cited

U.S. PATENT DOCUMENTS

| | | | | |
|---|---|---|---|---|
| 9,383,983 | B2* | 7/2016 | Hung | G06F 21/53 |
| 9,448,790 | B2* | 9/2016 | Collison | G06F 8/71 |
| 9,542,566 | B2* | 1/2017 | Yu | G06F 21/12 |
| 10,078,579 | B1* | 9/2018 | Joshi | G06F 11/3688 |
| 2002/0049962 | A1* | 4/2002 | Kelbaugh | G06F 11/3664 |
| | | | | 717/128 |
| 2004/0111284 | A1* | 6/2004 | Uijttenbroek | G06Q 10/10 |
| | | | | 705/52 |
| 2007/0118527 | A1* | 5/2007 | Winje | G06F 21/6218 |
| 2010/0274806 | A1* | 10/2010 | Allen | G06F 9/455 |
| | | | | 707/770 |
| 2011/0265077 | A1* | 10/2011 | Collison | G06F 8/71 |
| | | | | 717/172 |
| 2012/0198559 | A1* | 8/2012 | Venkata Naga Ravi | |
| | | | | G06F 21/62 |
| | | | | 726/26 |
| 2012/0331519 | A1* | 12/2012 | Yu | G06F 21/12 |
| | | | | 726/1 |
| 2014/0059703 | A1* | 2/2014 | Hung | G06F 21/53 |
| | | | | 726/28 |
| 2014/0282849 | A1* | 9/2014 | Collison | H04L 63/08 |
| | | | | 726/1 |
| 2014/0379677 | A1* | 12/2014 | Driesen | G06F 16/245 |
| | | | | 707/704 |
| 2015/0019700 | A1* | 1/2015 | Masterson | H04L 41/50 |
| | | | | 709/223 |
| 2015/0088834 | A1* | 3/2015 | Wright, Sr. | G06F 17/30377 |
| | | | | 707/689 |
| 2015/0120900 | A1* | 4/2015 | Sahoo | G06F 21/6227 |
| | | | | 709/223 |
| 2015/0373117 | A1* | 12/2015 | Gleyzer | H04L 45/566 |
| | | | | 709/215 |
| 2016/0043970 | A1* | 2/2016 | Jacob | H04L 47/828 |
| | | | | 709/226 |
| 2016/0094478 | A1* | 3/2016 | Quinn | H04L 47/786 |
| | | | | 709/226 |
| 2016/0098254 | A1* | 4/2016 | Paternostro | G06F 8/35 |
| | | | | 717/105 |
| 2017/0046235 | A1* | 2/2017 | Straub | G06F 11/1474 |
| 2017/0177892 | A1* | 6/2017 | Tingstrom | G06F 16/22 |
| 2017/0249141 | A1* | 8/2017 | Parees | G06F 8/70 |
| 2017/0249472 | A1* | 8/2017 | Levy | G06F 21/602 |
| 2017/0339148 | A1* | 11/2017 | Syomichev | H04L 63/10 |
| 2018/0181383 | A1* | 6/2018 | Jagannath | G06F 9/50 |

OTHER PUBLICATIONS

Nider, J., et al., Cross-ISA Container Migration, Proceedings of the 9th ACM International on Systems and Storage Conference, Jun. 6-8, 2016, 1 page, [retrieved on Sep. 18, 2019], Retrieved from the Internet.*

* cited by examiner

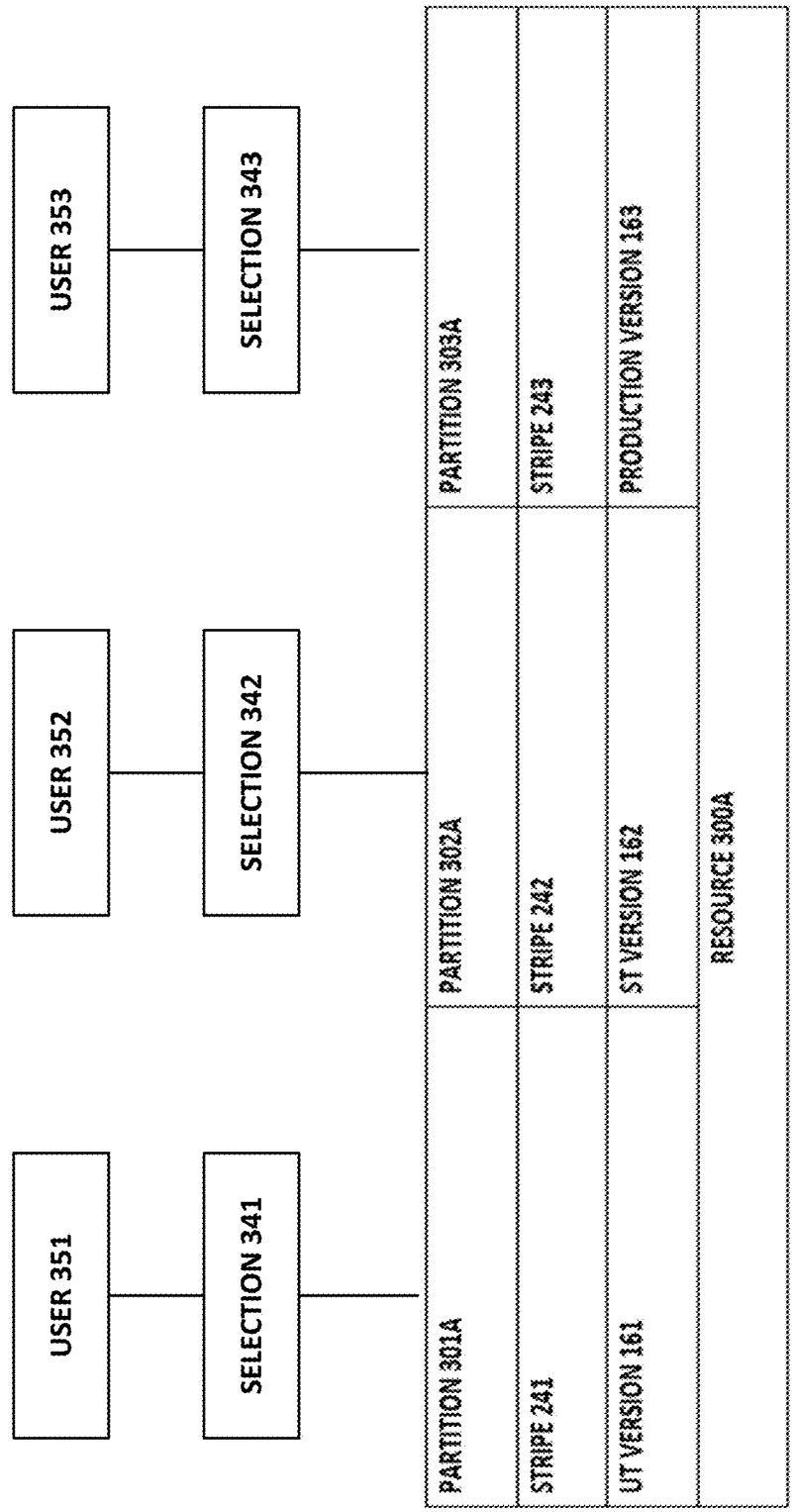

RESOURCE OPTIMIZATION USING DATA ISOLATION TO PROVIDE SAND BOX CAPABILITY

CROSS REFERENCES TO RELATED APPLICATIONS

This application claims priority from U.S. Provisional Patent Application Ser. No. 62/395,297, entitled RESOURCE OPTIMIZATION USING DATA ISOLATION TO PROVIDE SAND BOX CAPABILITY, filed on Sep. 15, 2016 which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

An application has a lifecycle where it is tested, validated and moved to production. For example, portions of the application may be tested separately. Once those portions have been successfully tested, the portions of the application may be tested together. When the assembled application has been successfully tested, it can be moved into a production environment. There may be a desire to add new features to the production level application. However, a service in the application may not be able to determine if a message or output it received is due to a production aspect or a test aspect of the application. The parts of the application that are in the process of being developed and tested are typically unstable and error prone. Further, providing resources for testing and putting the application into production can be expensive. Further still, it can be confusing for users to deal with the conflicting messages from the production aspect and the test aspect as well as working with the multiple lifecycle phases of the application. Therefore, techniques are needed that address the in ability to determine if a message or output is received from a production aspect or a test aspect of an application in a cost effective manner.

SUMMARY

Embodiments provide data isolation with respect to lifecycle phases of an application. For example, a test data isolation and a production data isolation of at least one resource are created. The test data isolation corresponds with a test lifecycle phase of the application and the production data isolation corresponds with a production lifecycle phase of the application. A first set of data is stored in the test data isolation and a second set of data is stored in the production data isolation. The first set of data and the second set of data include one or more of a process definition, credentials, or runtime data. A test version of the application is executed in the test data isolation. A production version of the application is executed in the production data isolation. The particular executing version of the application to only allowed access to the one or more of a process definition, authorization, credentials, or runtime data according to a lifecycle phase selected for a user so that a user's login procedure to a workspace is the same regardless the selected lifecycle phase.

A method of providing data isolation with respect to lifecycle phases of an application, the method comprises: creating a test data isolation and a production data isolation of at least one resource, wherein the test data isolation corresponds with a test lifecycle phase of the application and the production data isolation corresponds with a production lifecycle phase of the application; storing a first set of data in the test data isolation and a second set of data in the production data isolation; executing a test version of the application in the test data isolation; executing a production version of the application in the production data isolation; and allowing a particular executing version of the application to only access one or more of a process definition, authorization, credentials, or runtime data according to a lifecycle phase selected for a user so that a user's login procedure to a workspace is the same regardless the selected lifecycle phase.

A further understanding of the nature and the advantages of particular embodiments disclosed herein may be realized by reference to the remaining portions of the specification and the attached drawings.

BRIEF DESCRIPTION OF THE DRAWINGS

FIG. 3A depicts a system where all of the partitions execute on the same resource, according to one embodiment.

DETAILED DESCRIPTION OF EMBODIMENTS

Overview of Discussion

In cloud services, an application has a lifecycle with phases, such as unit test, system test and production. For example, the application is unit tested, system tested and put into production. While the application is in production, the customer may want to develop new functions for the application. To ensure that the updated application is stable and reliable, the updated application will be unit tested and system tested before it goes into production. In this case, a test version and the production version of the application may be executed simultaneously.

To reduce costs, one or more resources that are used for executing the production version of the application may also be used for executing the updated version of the application during unit test and system test. However, the production version of the application may have a multitude of processes and possibly thousands of users interacting with it. Since conventionally, the application's data is shared across all lifecycle phases, it is impossible for the test version and the production version to determine if a message or output is from the test version or the production version of the application.

One way to provide isolation would be for each phase of the application's development lifecycle to execute on its own dedicated process cloud resource. However, this is costly. Therefore, according to various embodiments, isolation of data for each of the lifecycle phases is provided while enabling the optimization of resources, for example, by sharing the same resource(s) for all of the lifecycle phases. Isolating the data for each of the phases prevents interference.

Further, one embodiment allows a user to log in to a workspace for a particular lifecycle phase without the user having to be aware of the data associated with respective lifecycle phases. Further still, an embodiment allows a user to log in to a workspace for a particular lifecycle phase without having to be aware of whether the topology of resources is a single resource or a complex topology with multiple resources. Further yet, various embodiments provide for a user not knowing about or maintaining multiple systems, a user not needing to worry about corruption of production data or effects on production code during testing, and a user does not have to replicate any processes in multiple environments. Instead, the user can perform unit test, system test and production from a single environment.

Illustration of Systems

Figure 1:
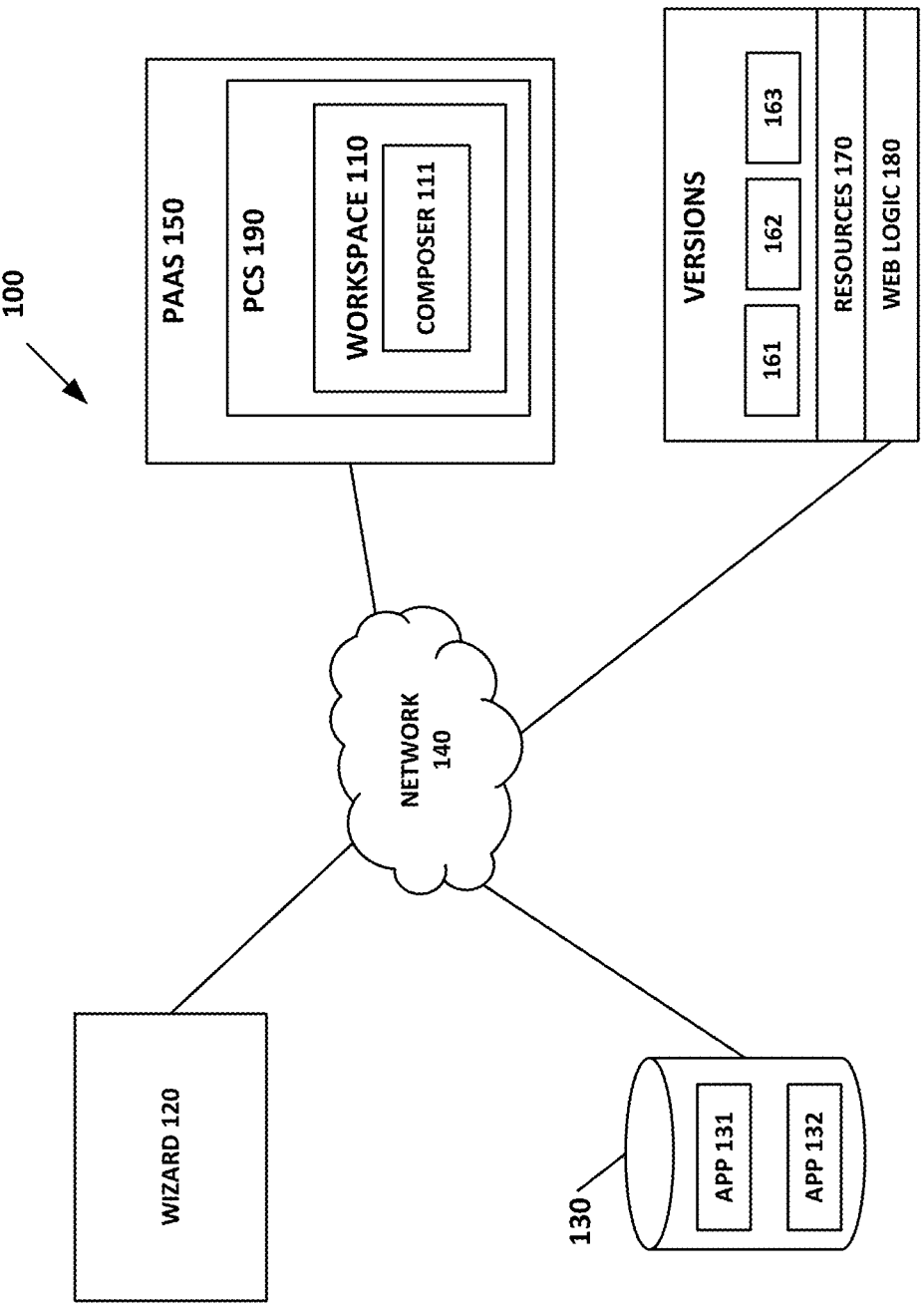
FIG. 1 depicts a block diagram of a system, according to one embodiment.

FIG. 1 depicts a block diagram of a system 100, according to one embodiment. The system 100 includes a network 140, a wizard 120, one or more data storage devices 130, Platform as a Service (PaaS) 150, web logic 180 for communicating with the network 140, resources 170, and at least one deployed version 161-163 of the application. The storage device 130 includes images of applications 131, 132 that can be uploaded and deployed for execution on one or more of the resources 170. An example of web logic 180 is Oracle® Weblogic that is an application server for building and deploying enterprise Java EE applications. Another example of web logic 180 is IBM®'s Websphere.

As discussed herein, there are different versions 161-163 of the deployed application for each of the phases of the application's lifecycle. Each of the versions 161-163 reside in a separate partition.

The resources 170 execute on top of the web logic 180 and the deployed application versions 161-163 execute on top of one or more of the resources 170. The web logic 180 provides communication between the resources 170, the deployed versions 161-163 and the network 140.

PAAS 150 includes PCS 190. Process Cloud Service (PCS) 190 includes workspace 110. Workspace 110 includes composer 111.

In a Platform as a Service (PaaS) service which offers a full lifecycle of phases, such as unit test, system test, and production, each type of data (also known as "an artifact") is distinguished with respect to the phase the artifact pertains to. Examples of artifacts include process definitions, credentials and run time data. A test version of an application is isolated from that of a production version of the application. This isolation helps to optimize the data center compute and storage resources. Packing test, production and any phase specific artifacts into one service instance improves the density of the compute resources along with reducing the cost of buying more service instances. An example of a service instance is a resource 170. According to one embodiment, the artifacts are grouped together into one service instance for all phases. This fully isolates every artifact from one phase to the other thereby providing a fully functional and secured environment to provide phased development of the applications. Therefore, various embodiments provide for defining the phases within or across multiple service instances. The multiple service instances model allows resource isolation across the phases and decentralizes the deployment of the application versions.

Oracle Process Cloud Service (PCS) is a cloud-based software development PAAS that provides a hosted environment for customer process applications. Oracle Process Cloud Service has a workspace 110 and a composer 111. In workspace 110, end users can perform process tasks, and administrators can monitor performance of the application versions. In composer 111, developers can create, test, and manage the lifecycle of application versions. Applications developed in composer 111 can be deployed to and used in workspace 110.

Wizard 120 can be used to deploy an application 131 or 132 into one or more resources 170 resulting in a deployed application version 161-163, as discussed herein. Each of the versions 161-163 may have different features. For example, a production version of the application 131 may have feature A. A system test version of the application 131 may have features A and B. A unit test version of the application 131 may have features A, B and C.

Figure 2:
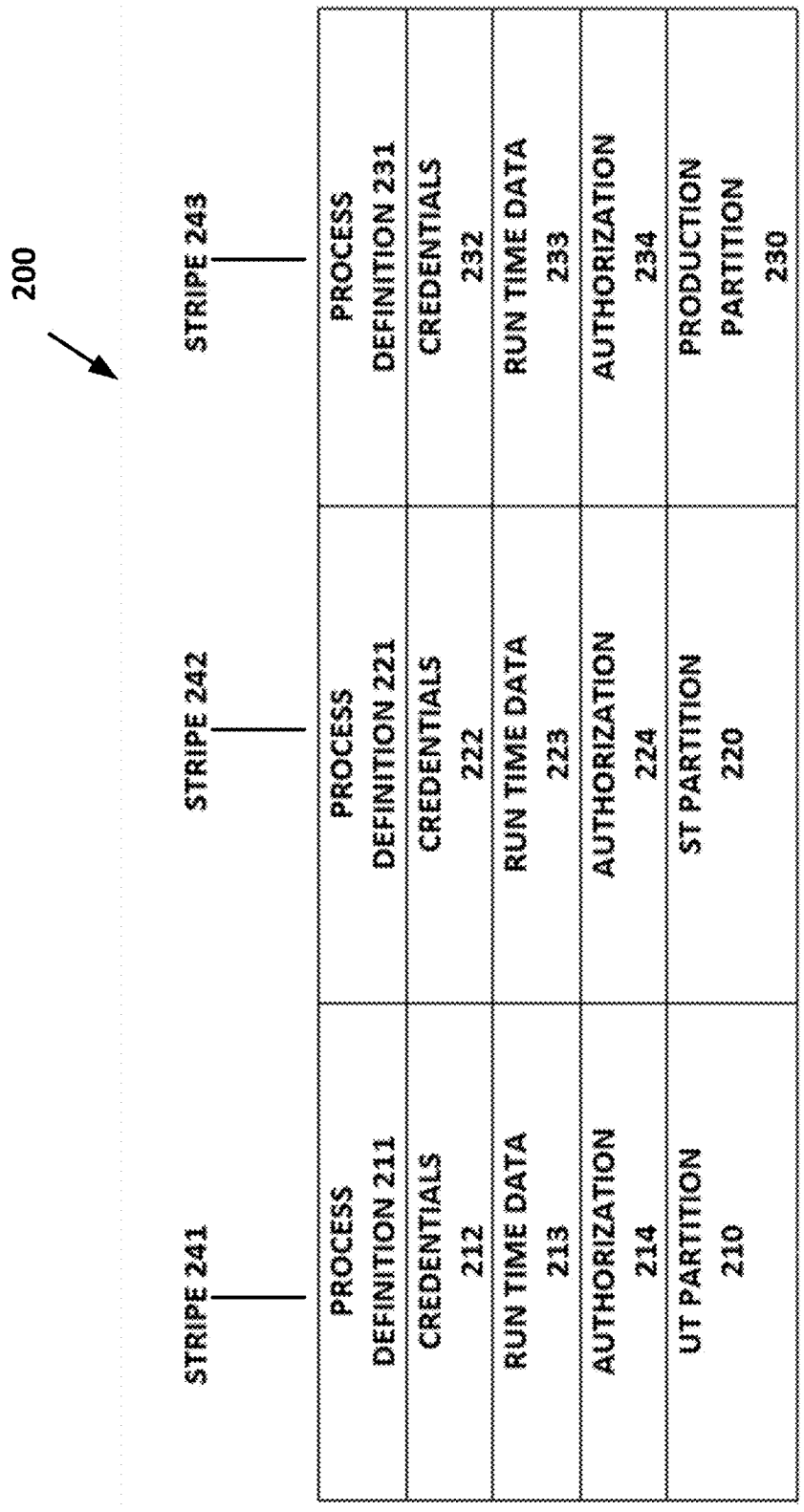
FIG. 2 depicts a block diagram of a data structure that isolates various types of data, according to one embodiment.

FIG. 2 depicts a block diagram of a data structure 200 that isolates various types of data, according to one embodiment.

As depicted in FIG. 2, the partitions include a unit test (UT) partition 210, a system test (ST) partition 220, and a production partition 230. The UT partition 210 includes process definition 211, credentials 212, run time data 213, and authorization 214. Partition 220 includes process definition 221, credentials 222, run time data 223 and authorization 224. Partition 230 includes process definition 231, credentials 232, runtime data 233, and authorization 234.

The data structure 200 is striped. For example, the partitions are used to stripe and to isolate data. A stripe in a partition and the data in the partition is also referred to as "isolated data." For example, stripe 241 includes data 211-214; stripe 242 includes data 221-224; and stripe 242 includes data 231-234. A partition is also known as a data isolation.

A type of data is also known as an "artifact." Examples of artifacts include process definitions, credentials, run time data, and authorization. According to various embodiments, each of the partitions receives and maintains its own set of artifacts. For example, UT partition 210's artifacts include data 211-214; ST partition 220's artifacts include data 221-224; and the production partition 230's artifacts include data 231-234.

According to one embodiment, the process definitions 211, 221, 231 of FIG. 2 are stored in a run time repository, the credentials 212, 222, 232 are stored in a policy store, the runtime data 213, 223, 233 are stored in a database schema, and authorizations 214, 224, 234 are stored in a policy store.

According to one embodiment, unit test data can be purged. For example, unit test data, such as data in the UT partition 210, can grow over a period of time and may block executing a production version since a database (DB) for PCS is space constrained. In order to reclaim the unit test data, the user is provided with a management operation to purge all unit test data. This is clubbed (also known as "combined") with the purge generic purge functionality that is provided by PCS, according to one embodiment. According to one embodiment, PCS also provides purging of test data.

As stated, conventionally, the production version of the application may have a multitude of processes and possibly thousands of users interacting with it. Since conventionally, the application's data is shared across all lifecycle phases, it is impossible for the test version and the production version to determine if a message or output is from the test version or the production version of the application. However, interference between the lifecycle phase versions of an application is prevented, according to one embodiment, since a particular executing version of an application is only allowed to access data in the data isolation for that particular executing version of the application. For example, version 161 (FIG. 1) can only access data 211, 212, 213, 214 (FIG. 2). Version 162 (FIG. 1) can only access data 221, 222, 223, 224 (FIG. 2). Version 163 (FIG. 1) can only access data 231, 232, 233, and 234 (FIG. 2).

Figure 3B:
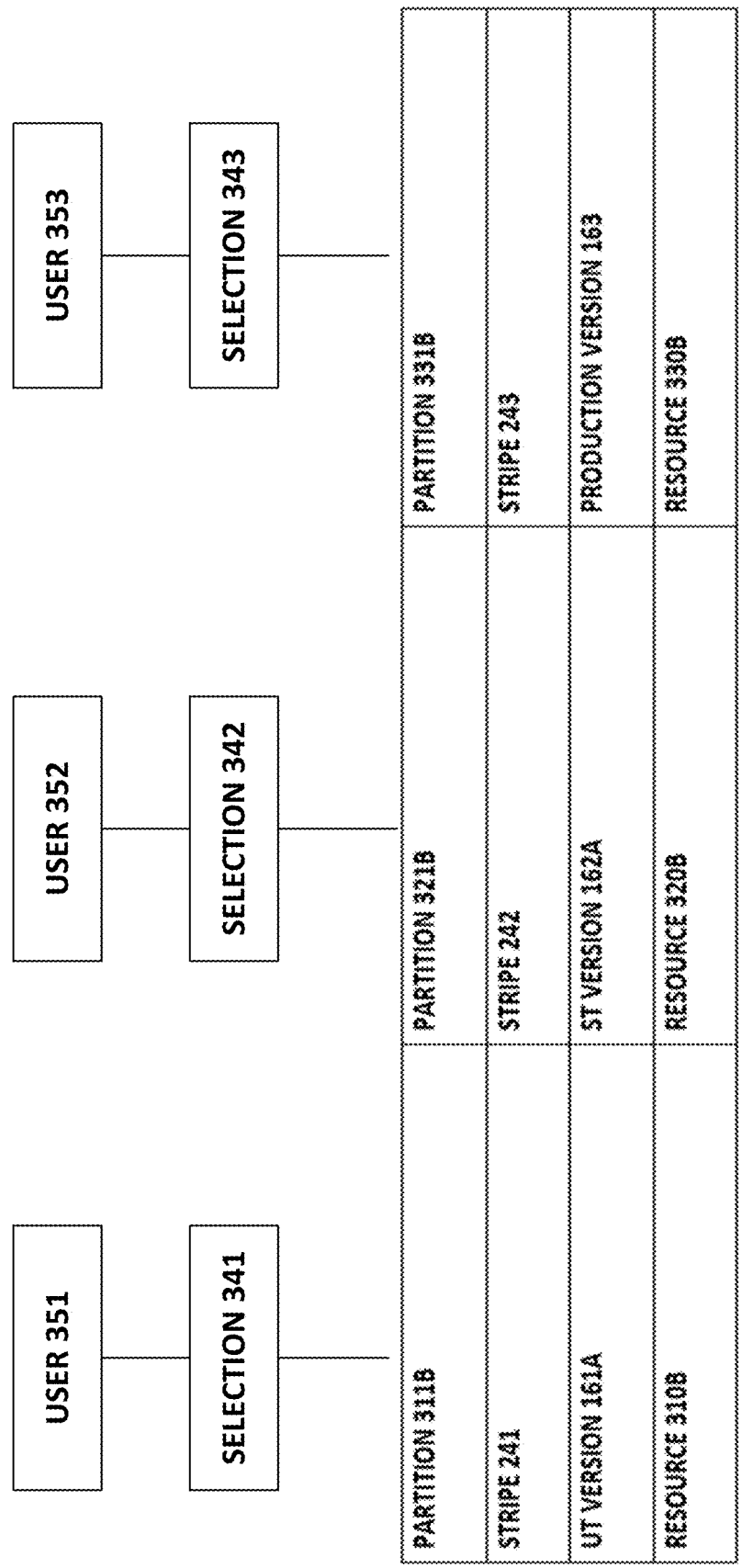
FIG. 3B depicts a system where each of the partitions execute on their own resource, according to one embodiment.

FIGS. 3A and 3B depict diagrams of system topologies, according to various embodiments.

FIG. 3A depicts a system topology where all of the partitions 301A, 302A, 303A execute on the same resource 300A, FIG. 3B depicts a system topology where each of the partitions 311B, 321B, 331B execute on their own resource 310B, 320B, 330B. For example, partition 311B executes on resource 310B; partition 321B executes on resource 320B; and partition 331B executes on resource 330B.

Different versions of the application are deployed into each of the partitions. For example, a unit test version 161 (FIG. 1) of the application is deployed into a first partition 301A or 311B (FIGS. 3A, 3B). A system test version 162 (FIG. 1) of the application is deployed into a second partition 302A or 321B (FIGS. 3A, 3B), and a production version 163 (FIG. 1) of the application is deployed into a third partition 303A or 331B (FIGS. 3A, 3B).

Further, the data is isolated in each of the partitions. For example, referring to FIG. 3A, stripe 241 is isolated in partition 301A; stripe 242 is isolated in partition 302A; and stripe 243 is isolated in partition 303A. Referring to FIG. 3B, stripe 241 is isolated in partition 311B; stripe 242 is isolated in partition 321B; and stripe 243 is isolated in partition 331B.

Embodiments are well suited to the lifecycle including fewer or more or different phases. An example of another lifecycle phase is function test.

Referring to FIGS. 2 and 3A, partition 301A is an example of a UT partition 210; partition 302A is an example of a ST partition 220; and partition 303A is an example of a production partition 230. Referring to FIGS. 2 and 3B, partition 311B is an example of a UT partition 210; partition 321b is an example of a ST partition 220; and partition 331B is an example of a production partition 230.

The one or more partitions, and their associated versions of an application and stripe, can reside on one or more resources. For example, referring to FIG. 3A, all of the partitions 301A-303A reside on one resource 300A. Referring to FIG. 3B, each of the partitions 311B, 321B and 331B reside on separate resources 310B, 320B, and 330B.

According to one embodiment, each of the resources 300A, 310B, 320B, and 330B is a point of delivery (POD). An example of a POD is a logical grouping of one or more virtual machines with PCS 190 executing on the POD. Therefore, each of the resources 300A, 310B, 320B, and 330B is a runtime system. Further, data level partitioning is provided, for example, by partitioning a version of an application and corresponding stripe for each lifecycle phase of the application, as discussed herein.

According to one embodiment, a PCS install template is provided. The PCS install template seeds the new file based policy stores for unit testing and system testing When existing PODs are upgraded, the following is performed, according to one embodiment:

All the existing applications, which are deployed to a 'testing' partition 210, 220 (FIG. 2) can be treated as system testing application version.

All the existing role mapping can be treated as if it is meant for production run. Any testing specific role memberships can be manually addressed.

All the existing CSF entries can be treated as if they are meant for production. Changes can be done manually, according to one embodiment.

Upgrade can be used to deploy the new application stripe enterprise archive (EAR) to the existing domains during upgrade.

In one embodiment, a particular executing version of the application is only allowed to access one or more of a process definition, authorization, credentials, or runtime data according to a lifecycle phase selected for a user so that a user's login procedure to a workspace is the same regardless the selected lifecycle phase. For example, selection logic 341, 342, 343 is used to direct each of the users 351, 352, 353 to access the stripe 241-243 and the version 161-163 of a particular partition 301A-303A, 311B-331B. Examples of selection logic 341-343 include authorizations configured by an administrator. More specifically, a user's user name and password may be authorized for accessing a particular partition and the stripe and version in that particular partition. In another example, a user's email address may be authorized for accessing the particular partition and the stripe and version in that particular partition.

The administrator can redirect the user's authorization from one partition to another without the user being aware. For example, during a first period of time, the selection logic 341 cause the user 341 access to partition 301A when they log in with their user name and password. The administrator can change the user's authorization to redirect their access from partition 301A to partition 302A for a second period of time. As a result, the selection logic 341 cause the user 341 to access partition 302A when they log in with the same user name and password, during the second period of time. Other types of information, such as an email address, can be used instead of a user name and password.

Isolated Data Examples

Examples of the isolated data include process definitions, authorization, credentials and run time data.

A graph of activities is used to provide a process definition, according to one embodiment. A process definition can integrate multiple systems together (also referred to herein as "an integrated multi-system"). Examples of systems that may be integrated together are Dropbox™ and payroll. Embodiments are well suited for integrating any type of systems that may interoperate with each other. Process definitions are stored in partitions in a runtime repository. Process definitions are also referred to as "definitions."

Figure 4:
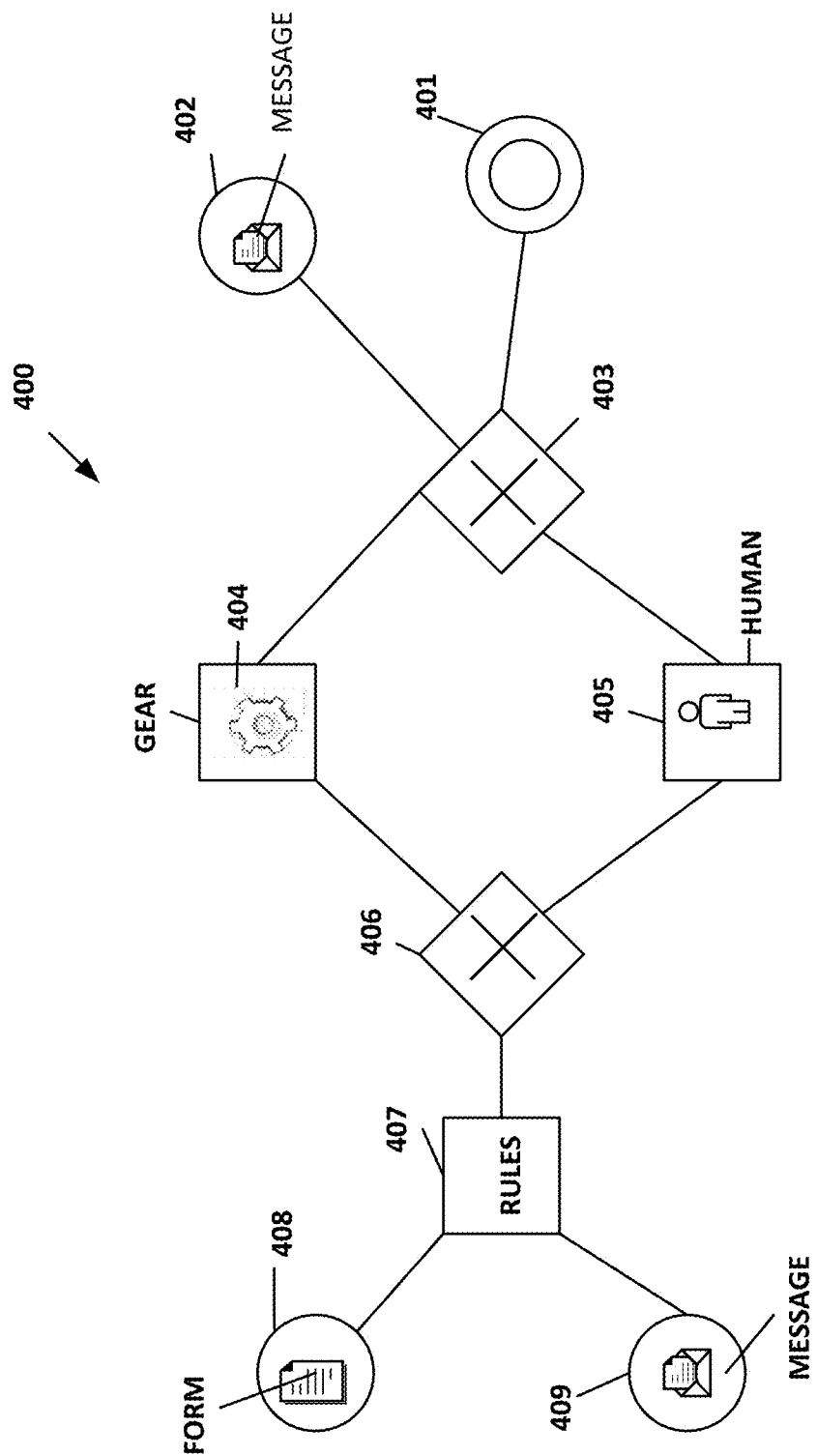
FIG. 4 depicts a process definition, according to one embodiment.

FIG. 4 depicts a process definition, according to one embodiment. The process definition 400 includes various activities 401, 402, 404, 405, 407, 408, 409 that are connected, as indicated by the lines between the depicted activities 401, 402, 404, 405, 407, 408, 409. The activities can be serial or in parallel. Activities can converge or diverge. For example, activities 402 and 401 converge at 403. Converge is also referred to as "join." Activities 404 and 405 diverge from 403. Activities 404 and 405 converge or join at 406. Examples of activities include human activities and service activities. Activity 404 is a service activity and activity 405 is a human activity. An activity, such as activity 402 or 409, can receive a message. An activity, such as 408, can be start with a user interface form. An activity, such as activity 401, could start with nothing. Rules can be associated with an activity, such as activity 407. According to one embodiment, an application that is defined by a process definition, as depicted in FIG. 4, is a composite application (also called a "composite").

With respect to authorization: Each of the systems in an integrated multi-system has their own authorization models specifying who can access a system or who can access various functions of the system. Authorizations are stored in a policy store. Authorizations are partitioned. An example of systems in an integrated multi-system that each have their own authorization models may be a payroll application that stores their attachments in a Dropbox™. In this case, Dropbox™ is one system and the payroll application is another system. In this example, Dropbox™ and the payroll application may be represented in a graph 400 with one or more activities.

An example of credentials are passwords. The credentials are stored in a credential store. Passwords are mapped to appropriate user identifiers and accounts.

An example of run time data are variables and associated values assigned to that data that is created and updated as an application version or process instance is executing. The run time data is stored, for example, in a database schema.

Artifacts include forms and type. An artifact type is a schema definition, such as eXtensible Markup Language schema definition (XSDS). An artifact type can represent a message. For example, fields of the type can be used to specify inputs of a service. According to one embodiment, an example of an artifact form is a stripe 241-243.

Illustration of an Implementation

The application development phases on composer 111, according to one embodiment, include unit test, system test, and production.

Unit testing can be performed by any developer who can model a process, according to one embodiment. The unit test phase can be performed in two ways: "test in player" and "test outside of player."

"Test in Player" offers consolidated view of instances, roles, tasks etc. Roles are used as a part of authorization. When an application is tested in player, the application is undeployed as soon as the player session completes. A version of the application is deployed into a 'player' Service Oriented Architecture (SOA) partition.

"Testing out of player" reuses workspace 110 access to verify the executing a version of the application. A user accesses the role management page of workspace 110 to manage the roles. Applications tested outside of player are also deployed to the "player" SOA partition.

Composer 111, according to one embodiment, is a user interface that enables registration of the resources 300A, 310B, 320B, 330B. A human process modeler can design a human workflow process with composer 111. End users can work on data using workspace 110.

A production version of the application is deployed from composer 111's management page of workspace 110. The deployment of the production version uses explicit privilege. The production version of the application is deployed to a "default" partition.

Data Isolation Striping is introduced at various levels of the system, such as Credential store and Oracle Platform Security Service (OPSS) roles, resulting in stripes 241-243 as depicted in FIG. 2. According to one embodiment, OPSS includes authorizations 214-234 and credentials 212-232. Data Isolation Striping is also referred to as "striping."

According to one embodiment, filtering mechanism are introduced in the APIs so the data is available, for example, only from a specific SOA partition 210, 220, 230 (FIG. 2).

According to one embodiment, a new identityContext 'dev' is added which will separate task/process instance assignments across the phases. The 'dev' context points to the jpsContext. JPS is a Java Virtual Machine Process Status Tool. Therefore, at the identity provider level, one identity and policy store is used.

A new application stripe called "BPMProcessRolesTest" can be added to the policy store, which holds all the roles created during the testing phases, such as unit test and/or system test, of the application.

Various application programming interfaces (APIs) are provided. For example, verification service excludes the application roles coming from a 'test' application stripe 241, 242 (FIG. 2) when the query is running using the production partition 230 (FIG. 2). Similarly it ignores the BPMProcessRolesTest application stripe roles when the query is executed under 'test' mode. The "test" mode can be unit test mode and system test mode.

Organization and Identity services are provided, according to various embodiments. For example, Human Workflow's (HWF's) Organization and Identity services pick the correct JPS context depending on the mode of workspace 110 (FIG. 1) and deployed version of the application in its respective partition. The mode of workspace is also referred to as "workspace mode." Since there is a one to one correspondence between partitions and phases, the application is deployed to a phase by deploying it to the partition for that phase. Both identity and organization APIs take the mode parameter which is used to determine what JPS context to use.

According to one embodiment, role striping is provided. For example, roles are stored in the policy store of OPSS. Separate application stripes are provided to store the roles. A new enterprise archive (EAR) file can be used to store an application stripe corresponding to the test mode associated with unit test and/or system test.

Configurations are provided, according to various embodiments. For example, workflow-identity-config.xml configuration allows adding multiple jpsContextName entries. Each of the entries will have different JPS context names for unit test (UT), system test (ST) and production. Further, the oracle.tip.pc.services.identity.jps.JpsProvider#init configuration allows adding multiple policy stores and selecting the right policy store based on the input parameter into identity service.

Representational State Transfer (REST) Application Programming Interface (API) can take an optional header parameter 'pcs-mode' which defaults to 'production', according to one embodiment. When the header parameter is set, filtering is applied accordingly in the REST API implementations. A predicate is returned based on the mode passed in the header of a message resulting from a REST API. As discussed herein, the mode correlates with the lifecycle phase.

Task assignment and process instance assignment during process execution of the run time system occur based on the SOA partition of the application version.

According to various embodiments, workspace 110 provides the following top level entities to the logged in user: a list of applications that user can start, a list of process instances related to the user, a list of tasks related to the user, and administration actions.

According to one embodiment, two workflow contexts are managed in workspace 110 each pointing to different realmNames. APIs can use the realm information to perform the query on the corresponding tasks created under that realm. A realm is a security real that comprises mechanisms for protecting WebLogic resources. Each security realm includes a set of configured security providers, users, security roles, and security policies. A user is defined in a security realm in order to access any WebLogic resources belonging to that realm. When a user attempts to access a particular WebLogic resource, WebLogic Server tries to authenticate and authorize the user by checking the security role assigned to that user in the relevant security realm and the security policy of the particular WebLogic resource. The two workflow context is used for the logged in user to maintain two contexts i.e., states.

Workspace 110, according to one embodiment, has a test mode and a production mode. Each of these modes corresponds to a lifecycle phase. According to one embodiment, 'test' mode provides all the data generated by the application version deployed to 'player' partition and production mode shows the same types of data generated by the application version deployed to a 'default' partition.

Workspace 110, according to one embodiment, introduces the mode option at the global level and passes the mode option to APIs used by workspace 110 for various embodiments described herein. This mode option provides a global switch that is used to filter types of process instances, tasks and to start mobile applications.

According to one embodiment, workspace 110 accepts the mode, from the mode option, as a query parameter (?mode=ut). The default value of this mode, when not passed as a query parameter, is 'production', according to one embodiment. A mode switch on user interface (UI) is visible when it is asked for. To perform a mode switch, another query parameter (hideMode=false|true) can be accepted.

TABLE 1 depicts the uniform resource locators (URLs) that are presented to the user via composer 111 (FIG. 1), according to one embodiment.

| Phase   | Mode       | hideMode | URL                                        |
| ------- | ---------- | -------- | ------------------------------------------ |
| default | production | true     | /bpm/workspace                             |
| test    | dev        | false    | /bpm/workspace?mode=dev&hidemode=false     |

According to one embodiment "mode=dev" is used as a part of determining the data associated with the appropriate partition when the user is logging in to workspace 110 (FIG. 1).

According to one embodiment, role management is provided. For example, workspace 110 (FIG. 1) when operated under the 'Test' mode provides a role management page to one or more users. The role management page maybe displayed to all users. This allows developers performing unit test to engage in role management operations. Security concerns are prevented because these roles are placed into a unit-testing policy store.

According to one embodiment, credential management is provided. For example, a credential management user interface provides entries corresponding to the map that corresponds to the mode that the workspace 110 (FIG. 1) is operating in. For example, workspace 110 can show st.wsm.security map entries when the workspace 110 is in 'System test' mode. As discussed herein, passwords and user names are mapped to each other. Credential striping is provided. For example, phase specific credential stores are provided, according to one embodiment. This provides unit test, system test and production with different credential store framework (CSF) maps defined as follows:

ut.wsm.security—Used for unit testing in credentials 232 (FIG. 2),
  st.wsm.security—Used for system testing in credentials 222 (FIG. 2),
  oracle.wsm.security—Used for production deployment in credentials 232 (FIG. 2).

Credentials are stored in a CSF, according to one embodiment.

Computer service archive (SAR) packaging is provided, according to various embodiments. For example, when a version of an application is deployed to a partition, composer 111 (FIG. 1) dynamically seeds the map name (csf.map) as an override parameter into wsmassembly. xml descriptor of the application to set the map name depending on the lifecycle phase.

To turn off analytics for deploying an application version to a player partition, a user can provide SAR packaging with the following change to the measurements.xml file.

```
<?xml version="1.0" encoding="UTF-8"?>
<ns0:measurements
xmlns:ns0="http://xmlns.oracle.com/bpm/analytics/measurementV20">
<ns0:compositeDN>App1</ns0:compositeDN>
<ns0:measurementElements>
<ns0:measurementElement name="Composite_Measurement"
type="COMPOSITE" enabled="true" userDefined="false">
<ns0:elementSelection>
<!-- add this -->
<ns0:noneList>NONE</ns0:noneList>
<!-- remove this-->
<!--ns0:specificSelection>INTERACTIVE</ns0:specificSelection-->
</ns0:elementSelection>
<ns0:elementStates>
<ns0:allList>ALL</ns0:allList>
</ns0:elementStates>
<ns0:businessIndicators allDimensions="true" allMeasures="true"
allAttributes="true"/>
```

-continued

```
</ns0:measurementElement>
</ns0:measurementElements>
</ns0:measurements>
```

According to one embodiment, composer 111 (FIG. 1) provides a dialog that depicts 'play' and 'test' options and makes the difference between them clear to the user. The "play" option can undeploy an application version at the end of execution.

User Interface(s)

Figure 5A:
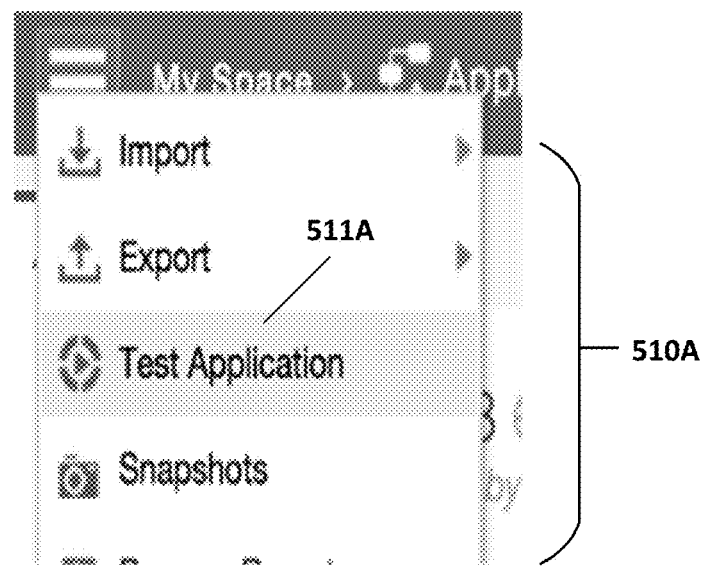
FIG. 5A depicts a menu, according to one embodiment.
Figure 5B:
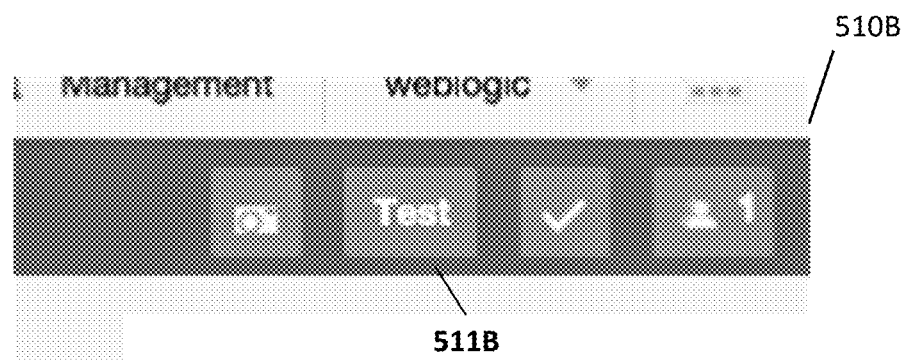
FIG. 5B depicts a toolbar, according to one embodiment.

FIG. 5A depicts a menu 510A with a test application operation 511A, according to one embodiment. FIG. 5B depicts a toolbar 510B with a test icon 511B, according to one embodiment.

Figure 6:
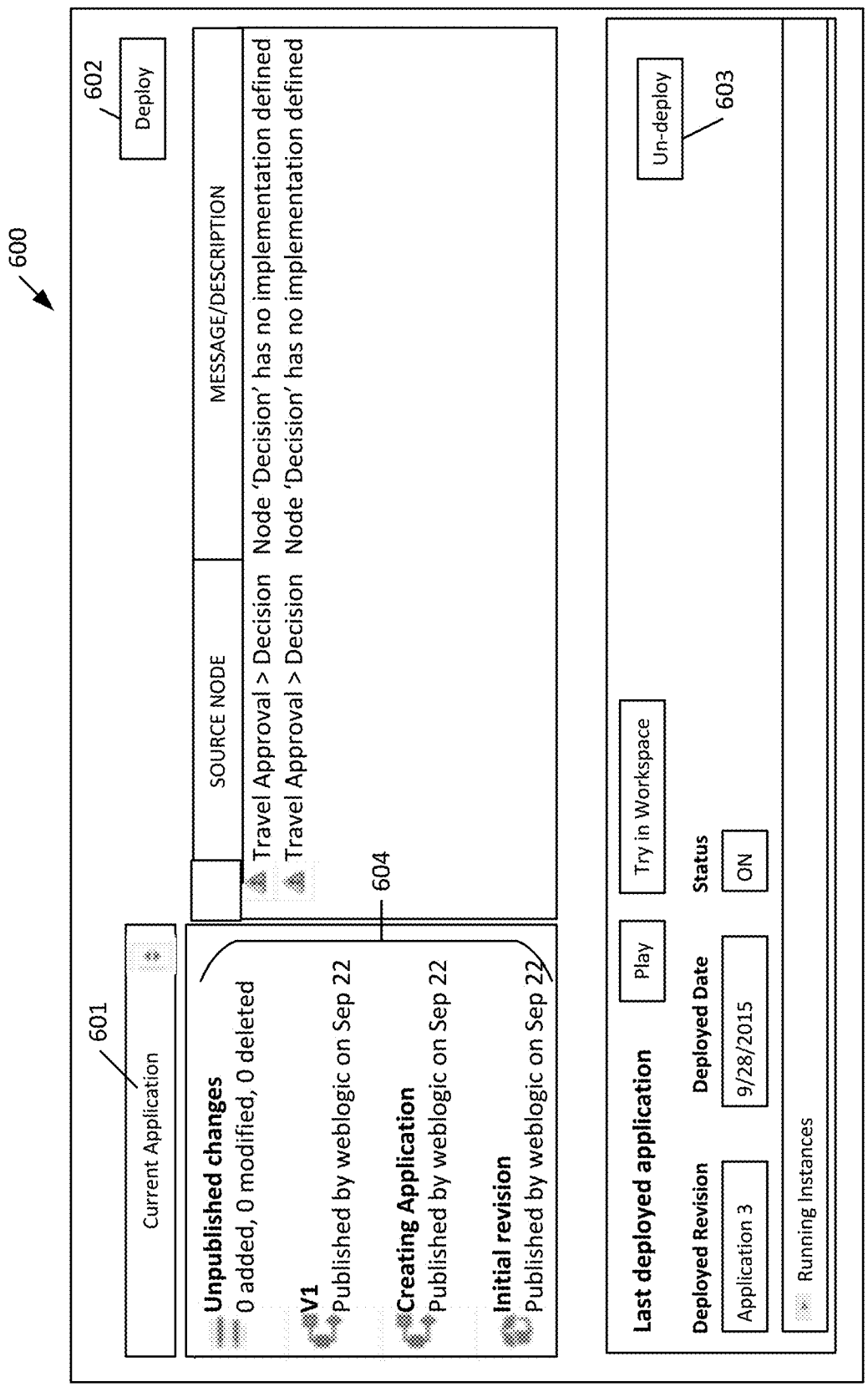
FIG. 6 depicts a test tab, according to one embodiment.

FIG. 6 depicts a test tab 600 that enables a user to manage and control a testing phase, according to one embodiment. Selection of either the application option 511A (FIG. 5A) or the test icon 511B (FIG. 5B) can be used to open the test tab 600 (FIG. 6). In that test tab 600, the user can switch between different application versions (current 601, last published, any snapshot) and check its status 604. As depicted in test tab 600, the current application 601 is selected. With respect to the "last published", after designing an application, a user can publish the application to make it available to the user. The user can publish many times. With respect to "any snapshot": a snapshot is a saved copy of an application at a particular point in time. The test tab 600 lists all entries of all snapshots and published applications, according to one embodiment.

Based on the user's selection, the user can deploy the current version of an application to a test partition, such as unit test partition 210 or system test partition 220 (FIG. 2), by clicking on the deploy button 602 (FIG. 6).

Once deployed, the user can manage the deployed application version in the same tab 600. The user can play that particular deployed application version multiple times without redeploying and also execute that deployed application version in workspace 110 (FIG. 1).

The user can also undeploy a deployed application version, for example, by selecting the un-deploy button 603 (FIG. 6).

Figure 7:
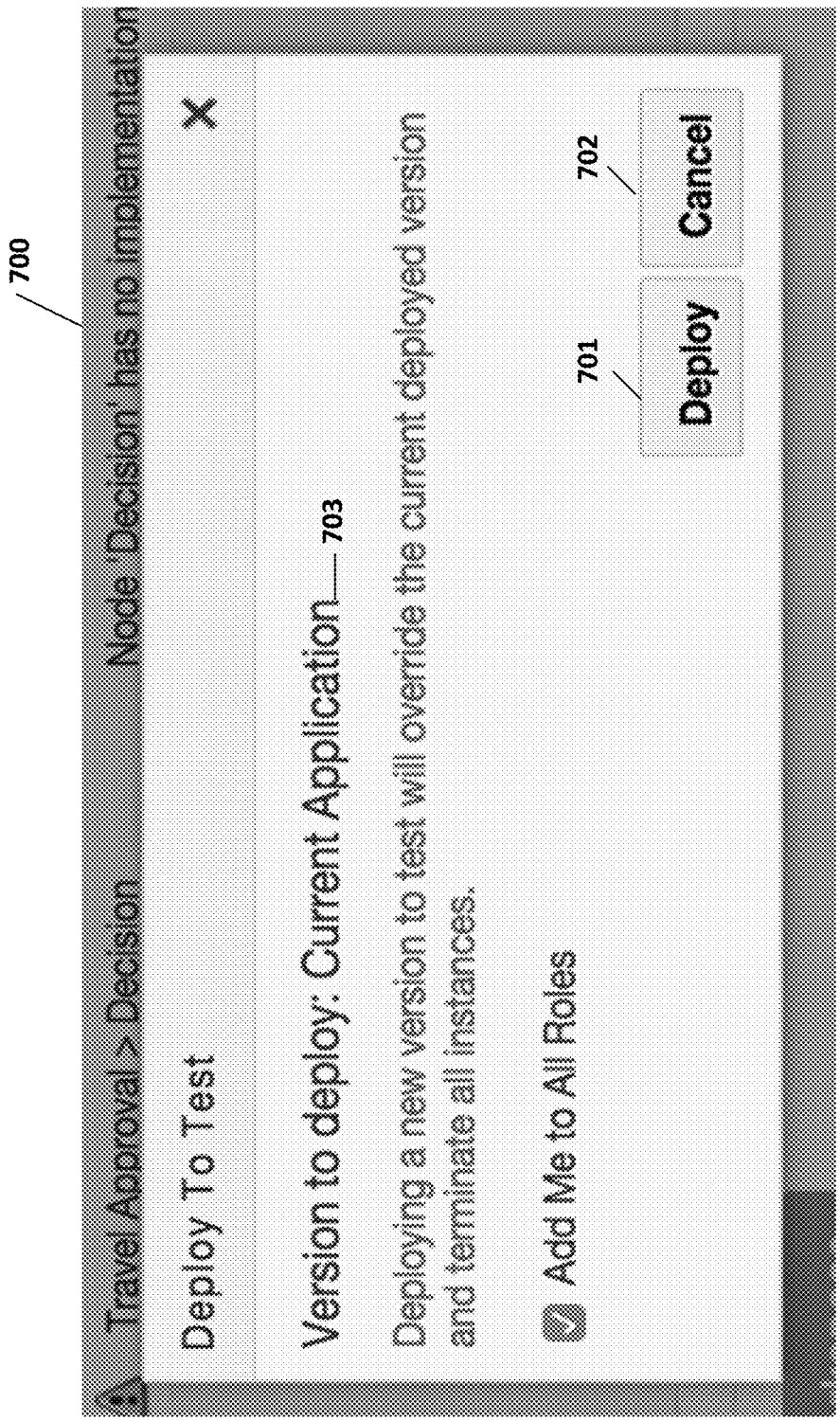
FIG. 7 depicts a message, according to one embodiment.

When a user clicks on the deploy button 602 (FIG. 6), the message 700 (FIG. 7) is displayed, indicating at 703, that the version that is being deployed is the current application version. The user can indicate they want to continue with the deployment process by clicking on the deploy button 701 (FIG. 7) or they can cancel the deployment process by clicking on the cancel button 702 (FIG. 7). If the user selects the deploy button 701, page 600 (FIG. 6) is displayed. The user can undeploy the application version by clicking the un-deploy button 603 (FIG. 6).

Therefore, according to one embodiment, the deployment process can be canceled before the application version is deployed by selecting the cancel button 702 (FIG. 7). The deployment process will proceed and the application version will be deployed if the deploy button 701 (FIG. 7) is selected. After the application version has been deployed, it can be undeployed by selecting the un-deploy button 603 (FIG. 6).

From the process editor, a user can quickly deploy changes the user made to the user's application version and test the application version in player. FIGS. 5-8 provide a user interface for the process editor. The quick deployment of changes is also referred to as "quick play."

Figure 8:
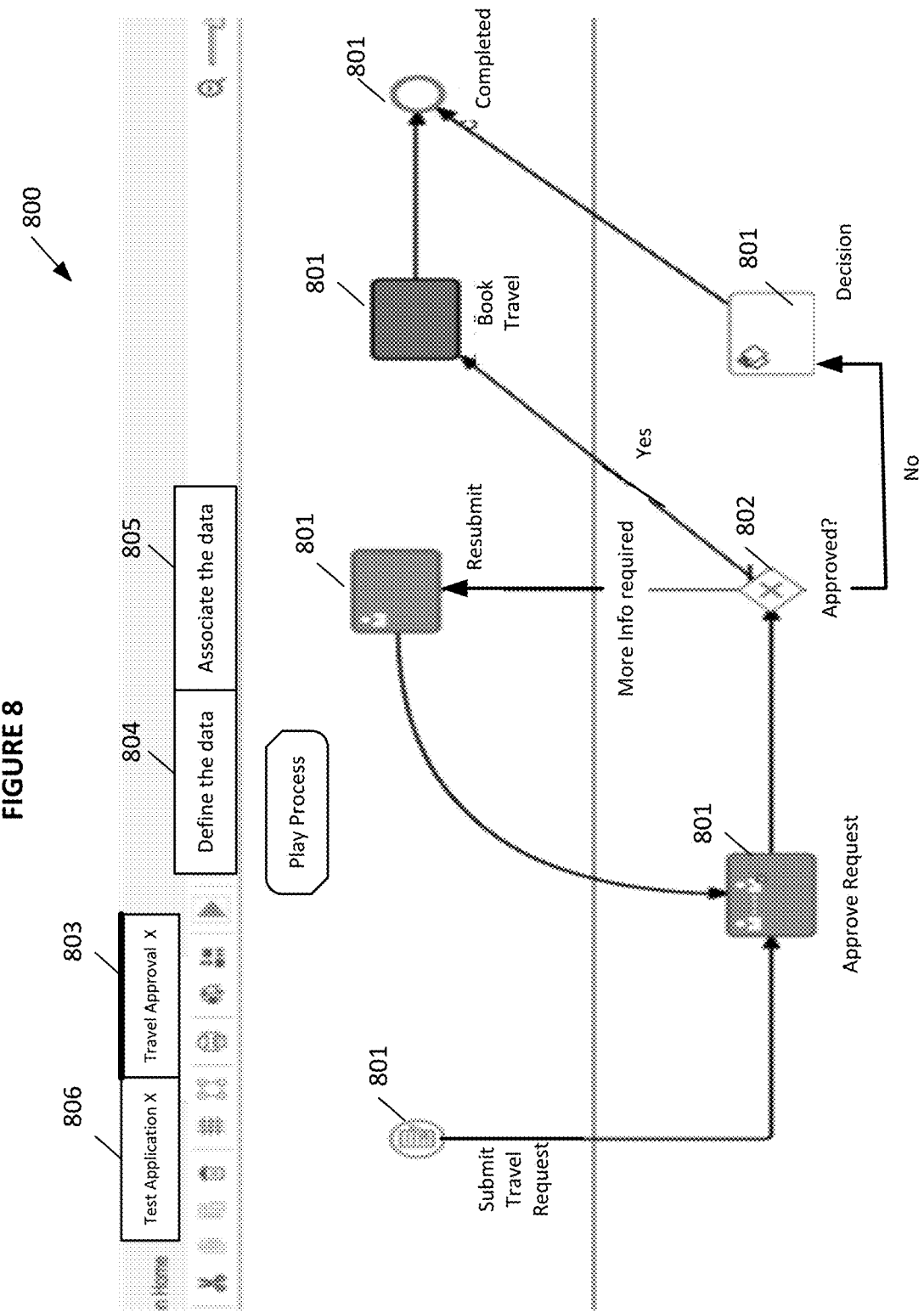
FIG. 8 depicts user interface for designing a process definition, according to one embodiment.

FIG. 8 depicts user interface 800 for designing a process definition 810, according to one embodiment. The process editor can be used for designing a process definition 801, according to one embodiment. The definition 801, as depicted, includes activities 801 and a join at 802. The process definition 801 is created for travel approval as indicated by the travel approval tab 803. The user interface 800 also provides tabs for defining the data 804, associating the data 805, and testing an application 806.

Figure 9:
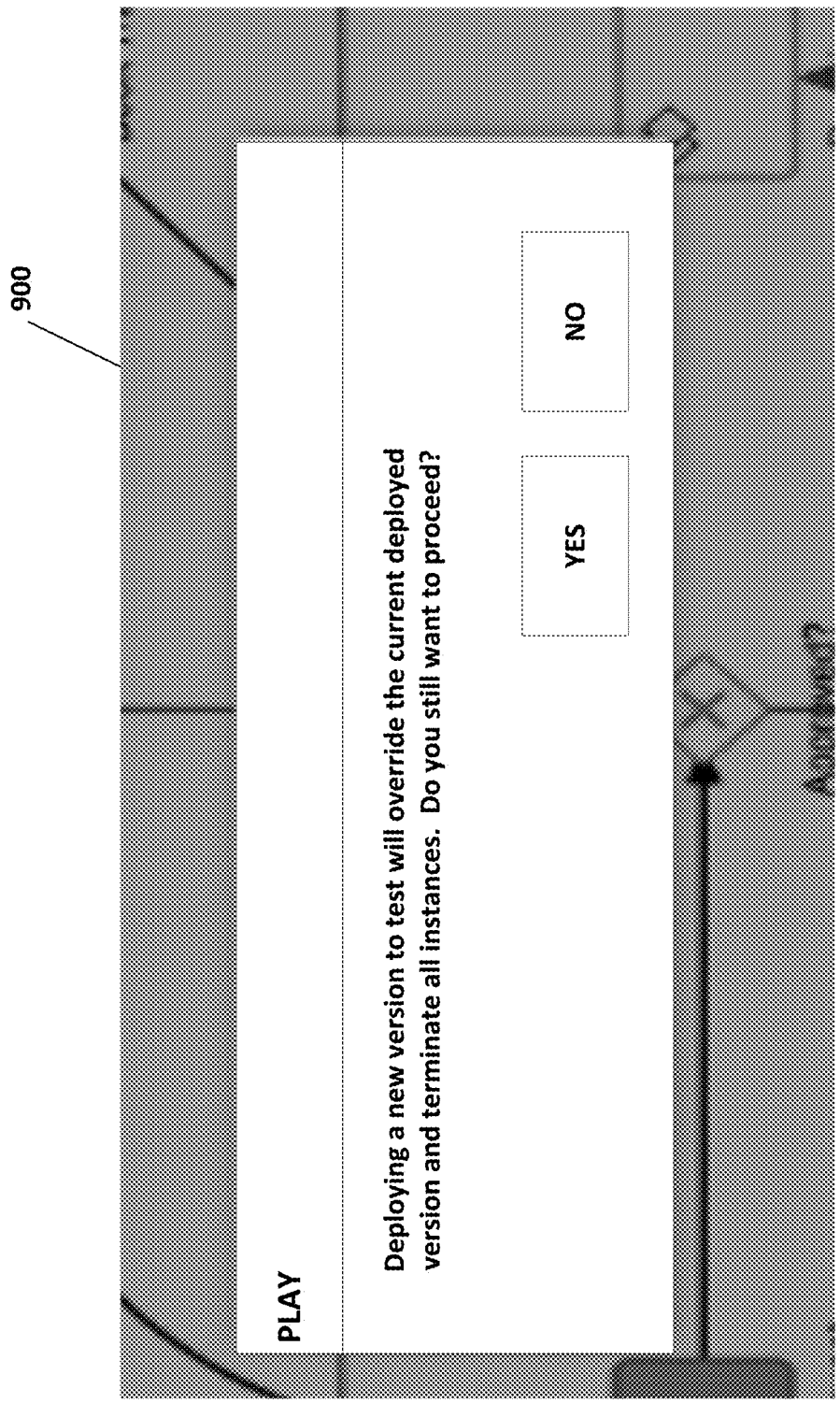
FIG. 9 depicts a message, according to one embodiment.

FIG. 9 depicts a message 900 that informs the user that a newly deployed version will override the currently deployed version, according to one embodiment. The user interfaces of FIGS. 6 and 8, according to one embodiment, are used as a part of "quick play." As only one application version can be deployed to test, running the player will override the deployed application version if changes are found. To run both, test tab and quick play, player credentials can be used, so an administrative user can setup that before a designer uses player or test framework.

Figure 10:
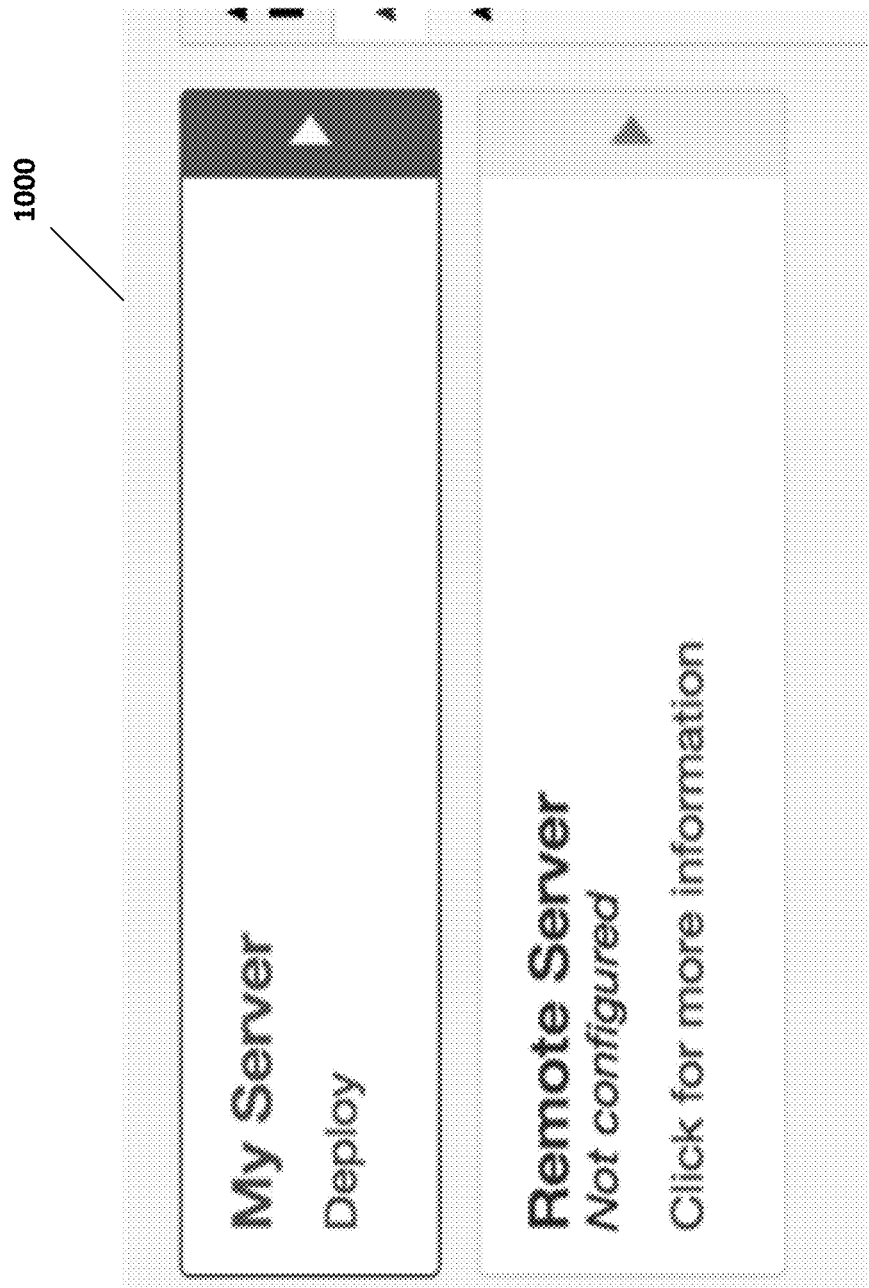
FIG. 10 depicts a user interface that is used for adding a local partition, according to one embodiment.

FIG. 10 depicts a management user interface that is used for adding a local partition, according to one embodiment. For example, the management user interface 1000 can be used to add one local partition that is totally independent from test. The added local partition can be used for production or for quality assurance (QA) validation. For example, if a user wants separate servers for testing and production, the user perform testing a first server and production on a second server. The user can use the user interface 1000 to move the application from the first server to the second server.

Figure 11:
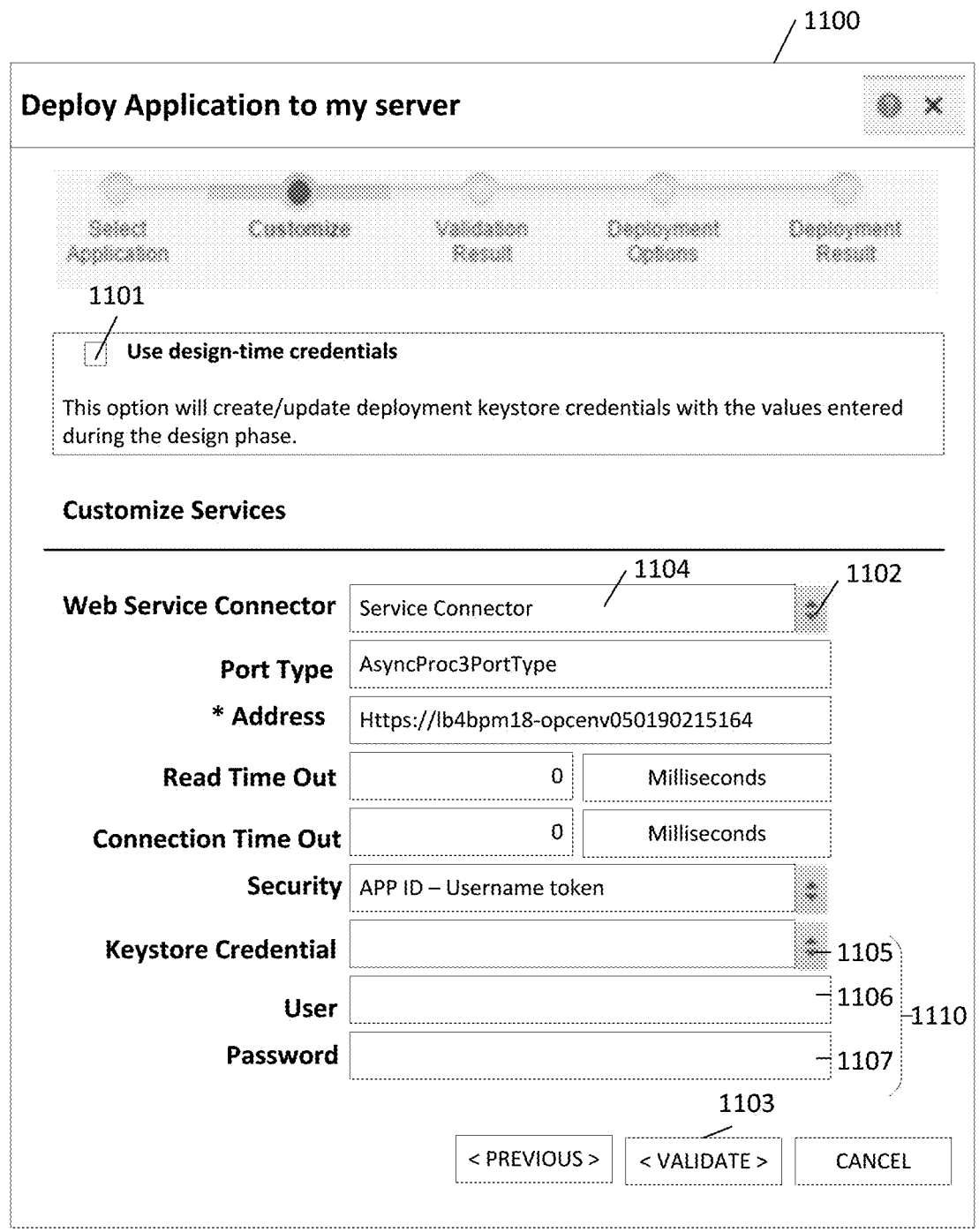
FIG. 11 depicts a page of a deployment wizard, according to one embodiment.

FIG. 11 depicts a page 1100 of a deployment wizard 120 (also referred to as a "design time web service connector wizard"), according to one embodiment.

Instead of a single 'bpm.' prefix, the credential store can have two different prefixes for the two different types of credentials being stored—design time credentials and deployment credentials. Design time credentials can have a 'dev.' prefix, and deployment credentials can have a 'bpm.' prefix. On the page 1100 (FIG. 11) of the deployment wizard 120 (FIG. 1), instead of presenting the design time credentials, the deployment credentials (if any exist) are presented. The user can choose one of the previously created deployment credentials or create a new one. An option is used to allow the users to import the credentials that they created during the design phase. If they select this option, the Keystore Credential list will be updated to remove the current list of deployment credentials and present the list of design time credentials.

The page 1100 includes a checkbox 1101 for promoting credentials from one phase to another phase. For example, the checkbox 1101 could be used for promoting credentials from system test to production. More specifically, if checkbox 1101 is selected, credentials 222 can be copied from the system test partition 220 to the production partition 230. In this case, credentials 222 in the system test partition 220 would be used as credentials 232 in the system test partition 220.

If the user selects the design time credentials checkbox 1101, the selected credential "myKey" is copied and a "bpm" credential is created in the credential store. There will now be two versions of this credential key—bpm.myKey and dev.myKey. If the user changes the username and/or password, using respective fields 1106 and 1107 (FIG. 11), during the deployment wizard 120 (FIG. 1), it will only affect bpm.myKey. If the user changes the username and/or password in the design time web service connector wizard, it will only affect dev.myKey.

The credential 1110 will only be created and/or updated when the user selects the Deploy button 701 (FIG. 7) at the end of the wizard 120 (FIG. 1), according to one embodiment. A user can create a new credential 1110 by specifying a key, a user and a password in respective fields 1105, 1106, 1107. A user can select a different web service connector using option 1102. The lines between activities depicted in FIG. 4 are examples of connectors. The selected web service connector is depicted in field 1104. If the user creates a new credential 1110 and then selects a different web service connector using option 1102, that new credential 1110 is added to the list of keystone credentials for the newly selected web connector depicted in field 1104.

The user is prevented, according to one embodiment, from switching between connectors if their current Connector has any required fields which are missing data. The user is able to fill out the details of each connector in any order they wish. According to one embodiment, no validation is performed until the user selects the validate button 1103. Then all of the connectors, including the current Web Service Connector depicted in field 1104, are validated. If an error is found, the user is notified about the failing connector and the failing connector can be loaded when the error is shown.

Note that if the user imports the design time credentials by selecting the "Use design-time credentials" checkbox 1101 and they can select a credential which has already been copied into the deployment credential store), then the user will be overwriting a credential which may be currently in use in a deployed application version. For example, if the user selects myKey from the design time credential list, then dev.myKey and bpm.myKey may both already exist if a user has performed this copy before. In this case, the user will be overwriting a credential currently used for the deployed application version. If the user chooses a different user and/or password, the current bpm.myKey credential will be invalidated.

A service connector, as depicted in field 1104, ties different systems together. The credentials 1110 associated with that service connector allows the two systems to communicate with each other. For example, if a service, such as payroll, stores its attachments in Dropbox™, then Dropbox™ and payroll are examples of two services that a service connector allows to communicate.

Illustration of a Method

Figure 12:
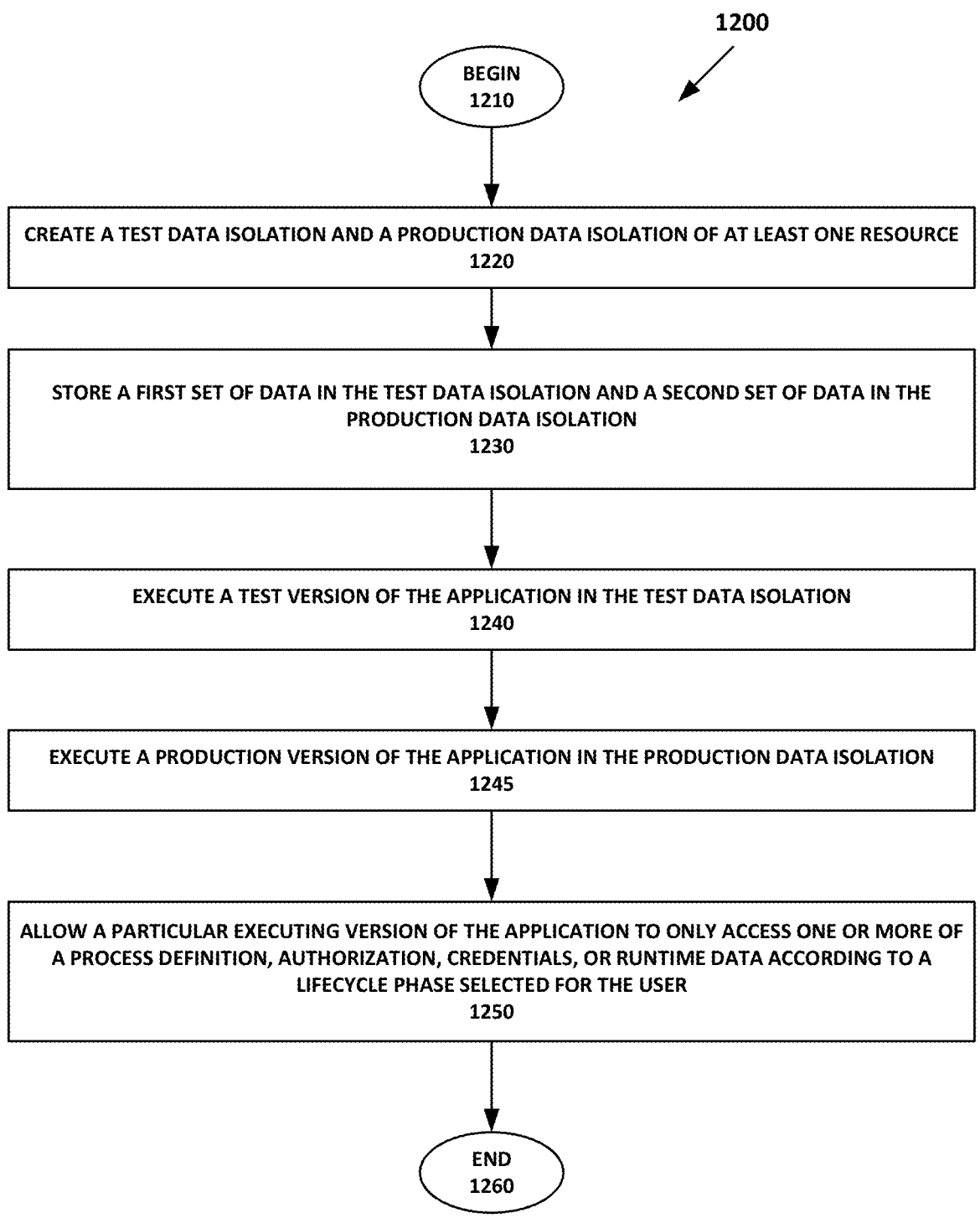
FIG. 12 depicts a flowchart of a method for providing data isolation with respect to lifecycle phases of an application, according to one embodiment.

FIG. 12 depicts a flowchart 1200 of a method for providing data isolation with respect to lifecycle phases of an application executable by a digital processor, according to one embodiment.

At 1210, the method begins.

At 1220 create a test data isolation and a production isolation of at least one resource are created.

Partitions are examples of data isolations, according to one embodiment. An example of a test data isolation is either a unit test partition 301A (FIG. 3A), 311B (FIG. 3B) or a system test partition 302A (FIG. 3A), 321B (FIG. 3B) or both.

Referring to FIG. 3A, partitions 301A, 302A, 303A were created for a single resource 300A that is shared across each of the partitions 301A, 302A, and 303A.

In another embodiment, referring to FIG. 3B, partition 311B was created for resource 310B; partition 321B was created for resource 320B; and partition 331B was created for resource 330B. Each of the data isolations associated with each of the partitions 311B, 321b, 331B is provided with a separate resource 310B, 320B, 330B. For example, the data isolation of partition 311B is associated with only resource 310B. The data isolation of partition 321b is associated with only resource 320B. The data isolation of partition 331B is associated with only resource 330B.

Embodiments are well suited for associating any number of data isolations with a resource.

Each of the data isolations corresponds with one of the lifecycle phases of the application. For example, partitions 301A and 311B are associated with unit test; partitions 302A and 321B are associated with system test; and partitions 303A and 331B are associated with production. There is a one to one correspondence between the partitions 310B, 320B, 330B and the phases of the application.

At 1230 store a first set of data in the test data isolation and a second set of data in the production data isolation.

For example, referring to FIGS. 2 and 3B, different sets of process definition 211, 221, 231, authorization 214, 224, 234, credentials 212, 222, 232, and runtime data 213, 223, 233 are stored into each of the partitions 310B, 320B, 330B. Referring to FIGS. 2 and 3A, different sets of process definition 211, 221, 231, authorization 214, 224, 234, credentials 212, 222, 232, and runtime data 213, 223, 233 are stored into each of the partitions 301A, 302A, 303A. In these examples, the first set of data includes data 211, 212, 213, 214 or data 221, 222, 223, 224; and the second set of data includes data 231, 232, 233, 234.

At 1240 execute a test version of the application in the test data isolation.

For example, the UT version 161 (FIGS. 3A, and 3B) and the ST version 162 (FIGS. 3A and 3B) are examples of a test version of an application. Partitions 301A, 302A (FIG. 3A), 311B (FIG. 3B), and 321B (FIG. 3B) are examples of test data isolations. Referring to FIG. 3A, UT version 161 executes in partition 301A and ST version 162 executes in partition 302A. Referring to FIG. 3B, UT version 161 executes in partition 311B and ST version 162 executes in partition 321B.

At 1245 execute a production version of the application in the production data isolation.

For example, partitions 303A (FIG. 3A) and 331B (FIG. 3B) are examples of a production data isolation. Referring to FIG. 3A, production version 163 executes in partition 303A. Referring to FIG. 3B, production version 163 executes in partition 331B.

Each of the versions corresponds with one of the lifecycle phases of the application. For example, version 161 corresponds with the unit test lifecycle phase, version 162 corresponds with the system test lifecycle phase; and version 163 corresponds with the production lifecycle phase.

At 1250 allow a particular executing version of the application to only access one or more of a process definition, authorization, credentials, or runtime data according to a lifecycle phase selected for a user so that a user's login procedure to a workspace is the same regardless the selected lifecycle phase.

For example, selection logic 341, 342, 343 is used to direct each of the users 351, 352, 353 to access the stripe 241-243 and the version 161-163 of a particular partition 301A-303A, 311B-331B. Each of the stripes 241-243 include respective sets of process definition, authorization, credentials, or runtime data as depicted in FIG. 2. For example, stripe 241 includes process definition 211, credentials 212, run time data 213 and authorization 214 and stripe 242 includes process definition 221, credentials 222, run time data 223 and authorization 224.

Examples of the selection logics 341-343 include authorizations configured by an administrator. More specifically, a user's user name and password may be authorized for accessing a particular partition and the stripe and version in that particular partition. In another example, a user's email address may be authorized for accessing the particular partition and the stripe and version in that particular partition.

The administrator can redirect the user's authorization from one partition to another without the user being aware. For example, during a first period of time, the selection logic 341 cause the user 341 access to partition 301A when they log in with their user name and password. The administrator can change the user's authorization to redirect their access from partition 301A to partition 302A for a second period of time. As a result, the selection logic 341 cause the user 341 to access partition 302A when they log in with the same user name and password, during the second period of time. Other types of information, such as an email address, can be used instead of a user name and password.

A user's login procedure to a workspace is the same regardless of the selected lifecycle phase. For example, the user uses the same login information regardless of the lifecycle phase. Examples of login information includes user name and password or some other identifier, such as an email address. The user may also specify the lifecycle phase as part of logging in. Authorizations, provided for example by an administrator, can be used to provide the user access to a particular partition, based on the login information the user entered, as discussed herein.

As stated, conventionally, the production version of the application may have a multitude of processes and possibly thousands of users interacting with it. Since conventionally, the application's data is shared across all lifecycle phases, it is impossible for the test version and the production version to determine if a message or output is from the test version or the production version of the application. However, interference between the lifecycle phase versions of an application is prevented, according to one embodiment, since a particular executing version of an application is only allowed to access data in the data isolation for that particular executing version of the application. For example, version 161 (FIG. 1) can only access data 211, 212, 213, 214 (FIG. 2). Version 162 (FIG. 1) can only access data 221, 222, 223, 224 (FIG. 2). Version 163 (FIG. 1) can only access data 231, 232, 233, and 234 (FIG. 2).

According to one embodiment, a coherent user experience across the data isolations is provided with respect to the at least one resource for executing the application. For example, when a user logs in to workspace 110 (FIG. 1), a context is established that is tied to one of the partitions. The selection logic 341, 342, 343, as discussed herein, provides a coherent user experience across the data isolations. Further, when a user logs in to workspace 110, the process definition, authorization, credentials, and runtime data for that partition are obtained for the lifecycle phase. The appropriate data—process definition, authorization, credentials, and runtime data—is provided to the user based on the log in information the user entered into workspace 110 without the user being aware of the data associated with respective lifecycle phases and without the user being aware of whether the topology of resources is a single resource, as depicted in FIG. 3A, or is a complex topology with multiple resources, as depicted in FIG. 3B.

More specifically, referring to FIGS. 2 and 3A, if the lifecycle phase is unit test, then partition 301A and its associated data—process definition 211, authorization 214, credentials 212, and runtime data 213—is used. If the lifecycle phase is system test, then partition 302A and its associated data—process definition 221, authorization 224, credentials 222, and runtime data 223—is used. If the lifecycle phase is production, the partition 303A and its associated data—process definition 231, authorization 234, credentials 232, and runtime data 233—is used.

Similarly, if the system in FIGS. 2 and 3B, is used, then partition 311B is used for unit test, partition 321B is used for system test, and partition 331B is used for production, and each of the partitions' respective data—process definition, authorization, credentials, and runtime data—is used, as discussed herein. More specifically, if the lifecycle phase is unit test, then partition 311B and its associated data—process definition 211, authorization 214, credentials 212, and runtime data 213—is used. If the lifecycle phase is system test, then partition 321B and its associated data—process definition 221, authorization 224, credentials 222, and runtime data 223—is used. If the lifecycle phase is production, then partition 331B and its associated data—process definition 231, authorization 234, credentials 232, and runtime data 233—is used.

Therefore, the appropriate data—process definition, authorization, credentials, and runtime data—is provided to the user based on the log in information the user entered into workspace 110 without the user being aware of the data associated with the partition the user is allowed to access and without the user being aware of whether a simple topology (FIG. 3A) or complex topology (FIG. 3B) is being used, thus, various embodiments provide a coherent user experience across the data isolations with respect to at least one resource for executing the application.

At 1260, the method ends.

In one embodiment, the user is not aware whether a topology of resources is a single resource or multiple resources. For example, the user 351-353 is not aware of whether a topology of the resources 300A or 310B-330B is a single source as depicted in FIG. 3A or multiple resources as depicted in FIG. 3B.

Various embodiments provide for wherein the creating of the test data isolation and the production data isolation of the at least one resource further comprises: sharing a single resource across the test data isolation and the production data isolation. FIG. 3A depicts an example of sharing a single resource 300A across data isolations 301A-303A.

Various embodiments provide for wherein the creating of the test data isolation and the production data isolation of the at least one resource further comprises: providing each of the test data isolation and the production data isolation with a separate resource. For example, FIG. 3B depicts an example of sharing each of the data isolations 311B, 321B, 331B with a separate resource 310B, 320B, 330B.

Various embodiments provide for the data isolations for the application based on the lifecycle phases that include unit test, system test and production. For example, FIGS. 3A and 3B depict providing data isolations 301A, 302A, 303A, 311B, 321b, 331B based on the lifecycle phases—unit test, system test, production—of the application Various embodiments provide for wherein the test data isolations further comprise a unit test data isolation and a system test data isolation. For example, referring to FIG. 2, UT partition 210 is an example of a unit test data isolation and ST partition 220 is an example of a system test data isolation.

Various embodiments provide for isolating one or more of process definition, credentials, run time data in each of the test data isolation and the production data isolation. For example, FIG. 2 depicts isolating process definition 211, 221, 231, credentials 212, 222, 232, run time data 213, 223, 233, in each of the data isolations 210, 220, 230.

Various embodiments provide for wherein the process definition is stored in a run time repository, the credentials are stored in a policy store, the credentials are stored in a credential store, and the run time data is stored in a database schema.

Various embodiments provide for creating a unit test data isolation and a system test data isolation; storing unit test data and a unit test version of the application in the unit test data isolation; executing the unit test version of the application in the unit test data isolation; accessing the unit test data only by the unit test version during the executing of the unit test version; storing system test data and a system test version of the application in the system test data isolation; executing the system test version of the application in the system test data isolation; and accessing the system test data only by the system test version during the executing of the system test version. For example, referring to FIG. 2, embodiments provide for creating a unit test data isolation 210 and a system test data isolation 220; storing unit test data 241 and a unit test version 161 of the application in the unit test data isolation 210; executing the unit test version of the application in the unit test data isolation; accessing the unit test data only by the unit test version during the executing of the unit test version; storing system test data 242 and a system test version 162 of the application in the system test data isolation 220; executing the system test version of the application in the system test data isolation; and accessing the system test data only by the system test version during the executing of the system test version.

Various embodiments provide for wherein each of the data isolations are partitions. For example, referring to FIGS. 3A and 3B, the data isolations 301A, 302A, 303A, 311B, 321B, 313B are partitions. Various embodiments provide for wherein the at least one resource is a logical grouping of one or more virtual machines. For example, each of the resources 170 (FIG. 1), 300A (FIG. 3A), 310B, 320B, 330B (FIG. 3B) can be logical groups of one or more virtual machines Various embodiments provide for creating, testing and managing the lifecycle phases of the application using a composer provided by Platform as a Service (PaaS). FIG. 1 depicts a composer 111 of PAAS 150 that can be used for creating, testing and managing the lifecycle phases, such as unit test, system test and production, of the application.

Various embodiments provide for allowing the second executing version of the application to only access one or more of a second process definition, a second authorization, second credentials, or second runtime data according to a second lifecycle phase selected by the user where a user's login procedure to the workspace is the same for the first lifecycle phase and the second lifecycle phase. For example, an administrator can redirect the user's authorization from one partition to another without the user being aware, as discussed herein.

Tangible Processor-Readable Storage Device and Apparatus

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor, such as a central processing unit, associated with the computer system. The tangible processor-readable storage device is hardware memory and the one or more processors are hardware processors.

Various embodiments provide for a tangible processor-readable storage device including instructions executable by a digital processor for a method of providing data isolation with respect to lifecycle phases of an application, the tangible processor-readable storage device including one or more instructions for: creating a test data isolation and a production data isolation of at least one resource, wherein the test data isolation corresponds with a test lifecycle phase of the application and the production data isolation corresponds with a production lifecycle phase of the application; storing a first set of data in the test data isolation and a second set of data in the production data isolation; executing a test version of the application in the test data isolation; executing a production version of the application in the production data isolation; and allowing a particular executing version of the application to only access one or more of a process definition, authorization, credentials, or runtime data according to a lifecycle phase selected for a user so that a user's login procedure to a workspace is the same regardless the selected lifecycle phase.

Various embodiments provide an apparatus comprising: one or more processors; and a tangible processor-readable storage device including instructions for: creating a test data isolation and a production data isolation of at least one resource, wherein the test data isolation corresponds with a test lifecycle phase of an application and the production data isolation corresponds with a production lifecycle phase of the application; storing a first set of data in the test data isolation and a second set of data in the production data isolation; executing a test version of the application in the test data isolation; executing a production version of the application in the production data isolation; and allowing a particular executing version of the application to only access one or more of a process definition, authorization, credentials, or runtime data according to a lifecycle phase selected for a user so that a user's login procedure to a workspace is the same regardless the selected lifecycle phase.

Example Computer Environment

Figure 13:
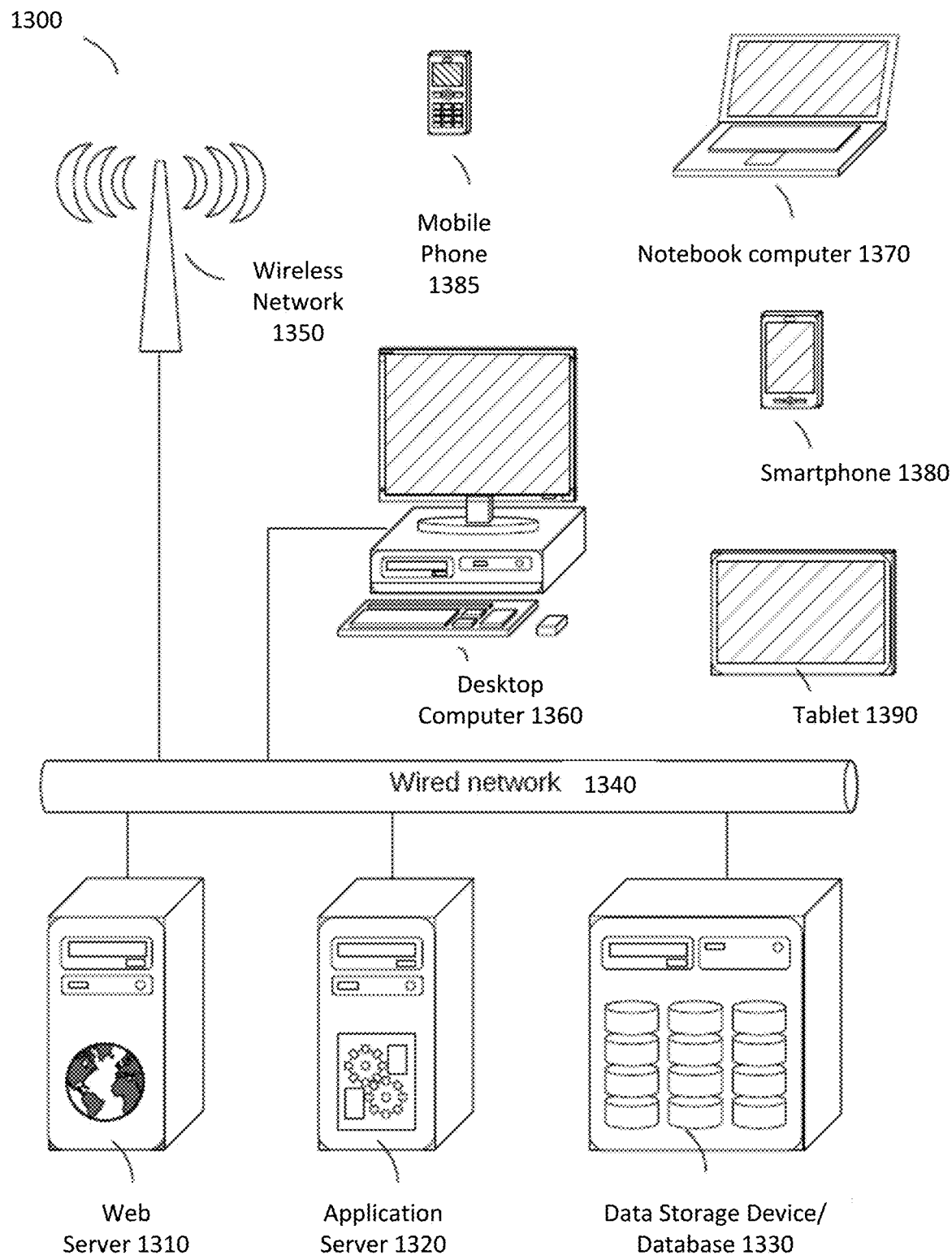
FIG. 13 is a general block diagram of a system and accompanying computing environment usable to implement the embodiments of FIGS. 1-12

FIG. 13 is a general block diagram of a system 1300 and accompanying computing environment usable to implement the embodiments of FIGS. 1-12. The example system 1300 is capable of supporting or running various hardware and/or software modules and associated methods discussed with reference to FIGS. 1-12. Note that certain embodiments may be implemented using one or more standalone applications (for example, residing in a user device) and/or one or more web-based applications implemented using a combination of client-side and server-side code.

The general system 1300 includes user devices 1360-1390, including desktop computers 1360, notebook computers 1370, smartphones 1380, mobile phones 1385, and tablets 1390. The general system 1300 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1300 is shown with five user devices, any number of user devices can be supported.

A web server 1310 is used to process requests from web browsers and standalone applications for web pages, electronic documents, enterprise data or other content, and other data from the user computers. The web server 1310 may also provide push data or syndicated content, such as RSS feeds, of data related to enterprise operations.

An application server 1320 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 1320 are adapted to process input data and user computer requests and can store or retrieve data from data storage device or database 1330. Database 1330 stores data created and used by the data applications. In an embodiment, the database 1330 includes a relational database that is adapted to store, update, and retrieve data in response to SQL format commands or other database query languages. Other embodiments may use unstructured data storage architectures and NoSQL (Not Only SQL) databases.

In an embodiment, the application server 1320 includes one or more general-purpose computers capable of executing programs or scripts. In an embodiment, web server 1310 is implemented as an application running on the one or more general-purpose computers. The web server 1310 and application server 1320 may be combined and executed on the same computers.

An electronic communication network 1340-1350 enables communication between user computers 1360-1390, web server 1310, application server 1320, and database 1330. In an embodiment, networks 1340-1350 may further include any form of electrical or optical communication devices, including wired network 1340 and wireless network 1350. Networks 1340-1350 may also incorporate one or more local-area networks, such as an Ethernet network, wide-area networks, such as the Internet; cellular carrier data networks; and virtual networks, such as a virtual private network.

The system 1300 is one example for executing applications according to an embodiment of the invention. In another embodiment, web server 1310, application server 1320, and optionally database 1330 can be combined into a single server computer application and system. In a further embodiment, virtualization and virtual machine applications may be used to implement one or more of the web server 1310, application server 1320, and database 1330.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1-13, system 100, data structure 200, systems depicted in FIGS. 3A, 3B, user interfaces of FIGS. 5A-11, and flowchart 12 may be implemented in whole or in part via one or more of the desktop computer 1360, notebook computer 1370, smartphone 1380, mobile phone 1385, tablet 1390, of FIG. 13 and/or other computing devices. In a particular example embodiment, the user computing devices 1360-1390 run browsers, e.g., used to display the user interfaces of FIGS. 5A-11.

In a particular example embodiment, browsers of the desktop computer 1360, notebook computer 1370, smartphone 1380, mobile phone 1385, tablet 1390 of FIG. 13 connect to the Internet, represented by the wired network 1340 and/or wireless network 1350 as shown in FIG. 13, to access one or more network-coupled servers, databases, and/or associated cloud-based functionality, as represented by the modules for 150, 161-163, 170, 180, 120, 130, 200 of FIGS. 1 and 2. Note that one or more of the web server 1310, application server 1320, and data storage device or database 1330 shown in FIG. 13 may be used to host software corresponding to the modules for 150, 161-163, 170, 180, 120, 130, 200 of FIGS. 1 and 2, as detailed more fully below.

In the particular example embodiment, entities 150, 161-163, 170, 180, and 120 reside and are executed on one more servers 1310, 1320; entities 130 of FIG. 1 and 200 of FIG. 2 reside on one or more databases 1330. The user interfaces depicted in FIGS. 5A-11 are provided by one or more servers 1310, 1320 and executed in browser(s) of one or more user devices 1360-1390, according to one embodiment. In another embodiment, the user interfaces depicted in FIGS. 5A-11 are provided by and executed by one or more user devices 1360-1390.

In general, users of workspace 110 of FIG. 1 may subscribe to certain cloud services to facilitate development of software applications and storage of associated files. A cloud service that is configured for software application or process flow development is called a Process Cloud Service (PCS) 190 of FIG. 1 herein.

A process cloud service may employ a networked database, e.g., the data storage device 1330 of FIG. 13, to store files and other objects used by a given software program being developed. Server-side development environments may be accessible to users via browsers. The user environments may be backed by the PCS, such that software application files 131, 132 are stored in the PCS database corresponding to the one or more of the data storage devices 1330 of FIG. 13.

In the particular example embodiment, the UI display screens (examples of which are shown in FIGS. 5A-11) include accompanying UI controls and associated options. Example options include options to select options, deploy applications, test, upgrade, cancel, select activities, select connectors, promote credentials, validate, browse, create, delete, define, upload, download, etc., folders, structures, and documents, etc., as maintained via the folder structures and documents.

Note that in the particular example embodiment, browsers used by the user devices 1360-1390 of FIG. 13, interface with web servers 1310 shown in FIG. 13 to access websites and accompanying webpage code, which is backed by at least workspace 110 of FIG. 1. The webpage code of the web servers 1310 of FIG. 13 use web services, APIs, and/or other interfacing mechanisms to communicate with the network 140 and the data storage 130 of FIG. 13.

Figure 14:
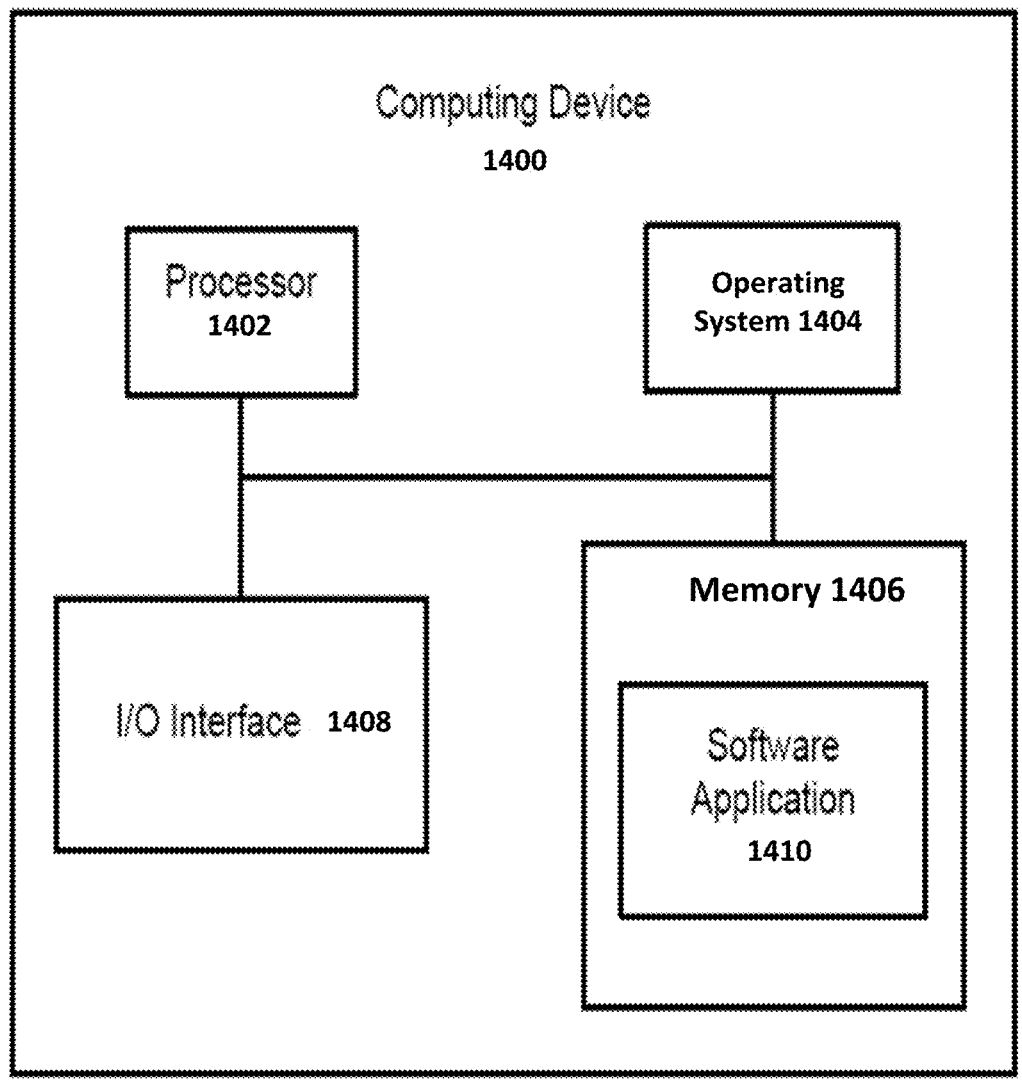
FIG. 14 is a general block diagram of a computing device usable to implement the embodiments of FIGS. 1-12.

FIG. 14 is a general block diagram of a computing device 1400 usable to implement the embodiments described herein. While the computing device 1400 of FIG. 14 may be described as performing one or more of the steps in the embodiments herein, in other embodiments any suitable component or combination of components of the computing device 1400 or any suitable processor or processors associated with system 1400 may facilitate performing the steps.

FIG. 14 illustrates a block diagram of an example computing system 1400, which may be used for implementations described herein. For example, computing system 1400 may be used to implement user devices 1360-1390, and server devices 1310, 1320 of FIG. 13 as well as to perform the method implementations described herein. In some implementations, computing system 1400 may include a processor 1402, an operating system 1404, a memory 1406, and an input/output (I/O) interface 1408. In various implementations, processor 1402 may be used to implement various functions and features described herein, as well as to perform the method implementations described herein. While processor 1402 is described as performing implementations described herein, any suitable component or combination of components of system 1400 or any suitable processor or processors associated with system 1400 or any suitable system may perform the steps described. Implementations described herein may be carried out on a user device, on a server, or a combination of both.

Computing device 1400 also includes a software application 1410, which may be stored on memory 1406 or on any other suitable storage location or computer-readable medium. Software application 1410 provides instructions that enable processor 1402 to perform the functions described herein and other functions. The components of computing system 1400 may be implemented by one or more processors or any combination of hardware devices, as well as any combination of hardware, software, firmware, etc.

For ease of illustration, FIG. 14 shows one block for each of processor 1402, operating system 1404, memory 1406, I/O interface 1408, and software application 1410. These blocks 1402, 1404, 1406, 1408, and 1410 may represent multiple processors, operating systems, memories, I/O interfaces, and software applications. In various implementations, computing system 1400 may not have all of the components shown and/or may have other elements including other types of components instead of, or in addition to, those shown herein.

Conclusion

Although the description has been described with respect to particular embodiments thereof, these particular embodiments are merely illustrative, and not restrictive. For example, other types of cloud services besides PCS could be used, such as service now or sales force.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used.

Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Various embodiments can be provided with logic encoded in one or more tangible media for execution by one or more hardware processors operable to perform the various embodiments described herein. A digital processor is a hardware processor, according to one embodiment.

We claim:

1. A tangible processor-readable storage device including instructions executable by a digital processor for a method of providing data isolation with respect to lifecycle phases of an application, the tangible processor-readable storage device including one or more instructions for:

creating a test data isolation and a production data isolation of at least one resource, wherein the test data isolation corresponds with a test lifecycle phase of the application and the production data isolation corresponds with a production lifecycle phase of the application;

storing a first set of data in the test data isolation and a second set of data in the production data isolation, wherein the first set of data and the second set of data are same types of data;

executing a test version of the application in the test data isolation;

executing a production version of the application in the production data isolation, wherein the test version and the production version are executed simultaneously;

allowing a particular executing version of the application to only access a process definition, authorization, credentials, and runtime data according to a lifecycle phase selected for a user; and providing the user with the same login procedure to a workspace regardless of the selected lifecycle phase based on the allowing of the particular executing version of the application to only access the process definition, the authorization, the credentials, and the runtime data according to the lifecycle phase selected for the user.

2. The tangible processor-readable storage device as recited by claim 1, wherein the user is not aware whether a topology of resources is a single resource or multiple resources.

3. The tangible processor-readable storage device as recited by claim 1, wherein the creating of the test data isolation and the production data isolation of the at least one resource further comprises:
sharing a single resource across the test data isolation and the production data isolation.

4. The tangible processor-readable storage device as recited by claim 1, wherein the creating of the test data isolation and the production data isolation of the at least one resource further comprises:
providing each of the test data isolation and the production data isolation with a separate resource.

5. The tangible processor-readable storage device as recited by claim 1, wherein test data isolations further comprise a unit test data isolation and a system test data isolation.

6. The tangible processor-readable storage device as recited by claim 1, wherein the method further comprises:
isolating one or more of a process definition, credentials, and run time data in each of the test data isolation and the production data isolation.

7. The tangible processor-readable storage device as recited by claim 1, wherein each of the data isolations is a partition.

8. The tangible processor-readable storage device as recited by claim 1, wherein the at least one resource is a logical grouping of one or more virtual machines.

9. The tangible processor-readable storage device as recited by claim 1, wherein the method further comprises:
creating, testing and managing the lifecycle phases of the application using a composer provided by a Platform as a Service (PaaS).

10. The tangible processor-readable storage device as recited by claim 1, wherein the lifecycle phase selected by the user is a first lifecycle phase and the particular executing version is a first executing version and wherein the method further comprises:
allowing a second executing version of the application to only access one or more of a second process definition, a second authorization, second credentials, or second runtime data according to a second lifecycle phase selected by the user where a user's login procedure to the workspace is the same for the first lifecycle phase and the second lifecycle phase.

11. A method of providing data isolation with respect to lifecycle phases of an application executable by a digital processor, wherein the method comprises:
creating a test data isolation and a production data isolation of at least one resource, wherein the test data isolation corresponds with a test lifecycle phase of the application and the production data isolation corresponds with a production lifecycle phase of the application;
storing a first set of data in the test data isolation and a second set of data in the production data isolation;
executing a test version of the application in the test data isolation;
executing a production version of the application in the production data isolation, wherein the test version and the production version are executed simultaneously;
allowing a particular executing version of the application to only access a process definition, authorization, credentials, and runtime data according to a lifecycle phase selected for a user; and
providing the user with the same login procedure to a workspace regardless of the selected lifecycle phase based on the allowing of the particular executing version of the application to only access the process definition, the authorization, the credentials, and the runtime data according to the lifecycle phase selected for the user.

12. The method as recited by claim 11, wherein the user is not aware whether a topology of resources is a single resource or multiple resources.

13. The method as recited by claim 11, wherein the creating of the test data isolation and the production data isolation of the at least one resource further comprises:
sharing a single resource across the test data isolation and the production data isolation.

14. The method as recited by claim 11, wherein test data isolations further comprise a unit test data isolation and a system test data isolation.

15. The method as recited by claim 11, wherein the method further comprises:
isolating one or more of a process definition, credentials, and run time data in each of the test data isolation and the production data isolation.

16. The method as recited by claim 15, wherein the process definition is stored in a run time repository, the credentials are stored in a policy store, the credentials are stored in a credential store, and the run time data is stored in a database schema.

17. The method as recited by claim 11, wherein each of the data isolations is a partition.

18. The method as recited by claim 11, wherein the at least one resource is a logical grouping of one or more virtual machines.

19. The method as recited by claim 11, wherein the method further comprises:
creating, testing and managing the lifecycle phases of the application using a composer provided by a Platform as a Service (PaaS).

20. An apparatus comprising:
one or more processors; and
a tangible processor-readable storage device including instructions for:
creating a test data isolation and a production data isolation of at least one resource, wherein the test data isolation corresponds with a test lifecycle phase of an application and the production data isolation corresponds with a production lifecycle phase of the application;
storing a first set of data in the test data isolation and a second set of data in the production data isolation;
executing a test version of the application in the test data isolation;
executing a production version of the application in the production data isolation, wherein the test version and the production version are executed simultaneously;
allowing a particular executing version of the application to only access a process definition, authorization, credentials, and runtime data according to a lifecycle phase selected for a user; and providing the user with the same login procedure to a workspace regardless of the selected lifecycle phase based on the allowing of the particular executing version of the application to only access the process definition, the authorization, the credentials, and the runtime data according to the lifecycle phase selected for the user.

* * * * *